(12) United States Patent
Lupien et al.

(10) Patent No.: US 9,080,257 B2
(45) Date of Patent: Jul. 14, 2015

(54) FIBROUS PLANT STALK DECORTICATOR

(75) Inventors: John C. Lupien, Omaha, NE (US); Michael Dyas, Waterloo, NE (US)

(73) Assignee: Bastlab, LLC, Omaha, ME (US)

( * ) Notice: Subject to any disclaimer, the term of this patent is extended or adjusted under 35 U.S.C. 154(b) by 0 days.

(21) Appl. No.: 13/807,047

(22) PCT Filed: Jun. 28, 2011

(86) PCT No.: PCT/US2011/042245
§ 371 (c)(1),
(2), (4) Date: Mar. 25, 2013

(87) PCT Pub. No.: WO2012/006118
PCT Pub. Date: Jan. 12, 2012

(65) Prior Publication Data
US 2013/0167327 A1    Jul. 4, 2013

Related U.S. Application Data

(60) Provisional application No. 61/359,089, filed on Jun. 28, 2010.

(51) Int. Cl.
*D01B 1/30* (2006.01)
*D01B 1/28* (2006.01)

(52) U.S. Cl.
CPC ... *D01B 1/30* (2013.01); *D01B 1/28* (2013.01)

(58) Field of Classification Search
CPC .............. D01B 1/14; D01B 1/28; D01B 1/30; D01B 1/32

USPC ...... 19/5 A, 5 R, 9, 10, 22, 24, 25, 26, 29, 30, 19/31
See application file for complete search history.

(56) References Cited

U.S. PATENT DOCUMENTS

| | | | | | |
|---|---|---|---|---|---|
| 398,058 | A | * | 2/1889 | Langhammer | 19/29 |
| 1,200,615 | A | * | 10/1916 | Hubler | 19/12 |
| 1,268,975 | A | * | 6/1918 | Hubler | 19/12 |
| 1,299,946 | A | * | 4/1919 | Hubler | 19/9 |
| 1,964,633 | A | | 6/1934 | Haynes | |
| 2,197,683 | A | | 4/1940 | Burkardt | |
| 2,288,652 | A | * | 7/1942 | Simons | 19/27 |
| 2,341,290 | A | * | 2/1944 | Reeves | 19/13 |
| 2,402,634 | A | | 6/1946 | Kaiser | |
| 2,404,457 | A | * | 7/1946 | Reeves | 19/16 |
| 2,576,406 | A | * | 11/1951 | McCrae et al. | 19/12 |
| 3,872,545 | A | | 3/1975 | Altosaar | |
| 4,241,474 | A | | 12/1980 | Doutre | |
| 5,447,238 | A | * | 9/1995 | Aldridge et al. | 209/3 |
| 5,447,276 | A | * | 9/1995 | Aldridge et al. | 241/79 |
| 5,507,073 | A | * | 4/1996 | Aldridge | 19/5 A |
| 5,906,030 | A | * | 5/1999 | Leduc et al. | 19/24 |
| 6,079,647 | A | * | 6/2000 | Leduc et al. | 241/73 |
| 6,357,083 | B1 | * | 3/2002 | Stratton et al. | 19/5 R |
| 7,152,610 | B2 | * | 12/2006 | Csavas | 132/271 |
| 2013/0276998 | A1 | * | 10/2013 | Park et al. | 162/20 |

\* cited by examiner

*Primary Examiner* — Shaun R Hurley
(74) *Attorney, Agent, or Firm* — Milligan PC LLO

(57) ABSTRACT

A fibrous plant stalk decorticator is disclosed. The decorticator includes a feeding device a breaker roll having a first plurality of blades, and a skutcher roll having a second plurality of blades. The skutcher is positioned such that the first and second pluralities of blades overlap. A plurality of air outlets pass through the blades and are configured to provided pressurized air to the fibrous plant stalk as it is passed through the decorticator.

10 Claims, 27 Drawing Sheets

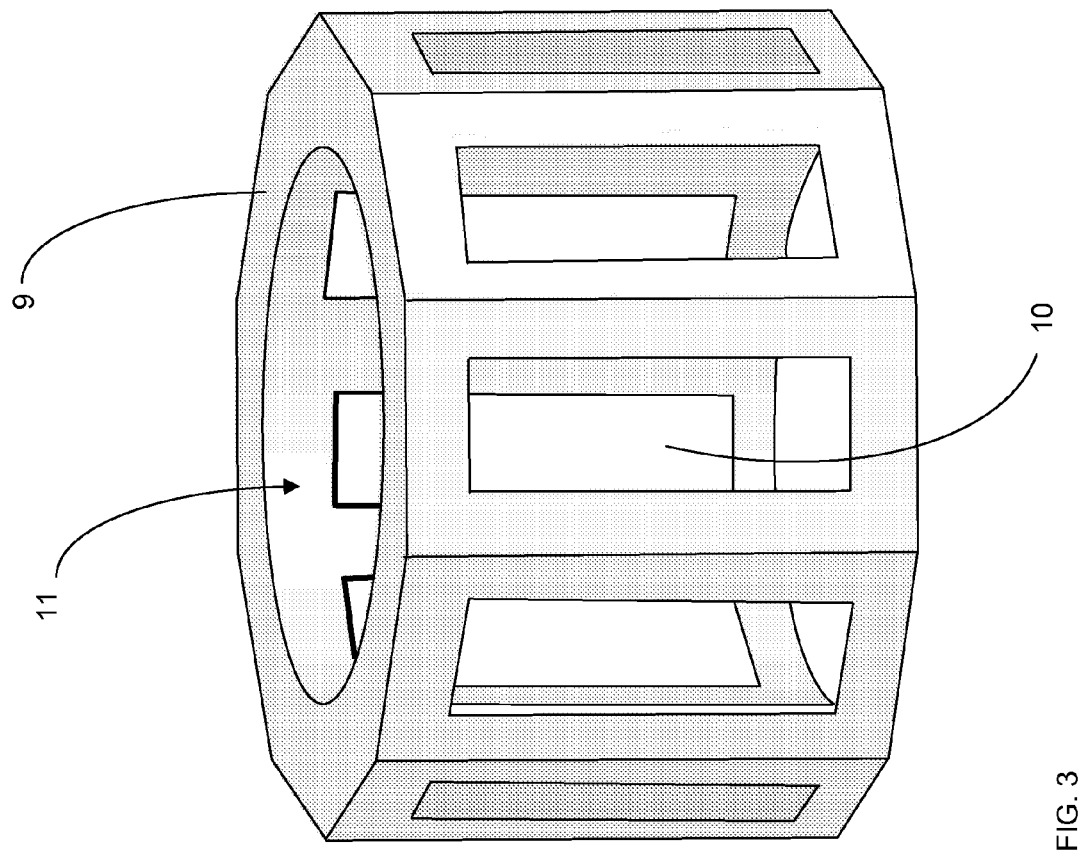
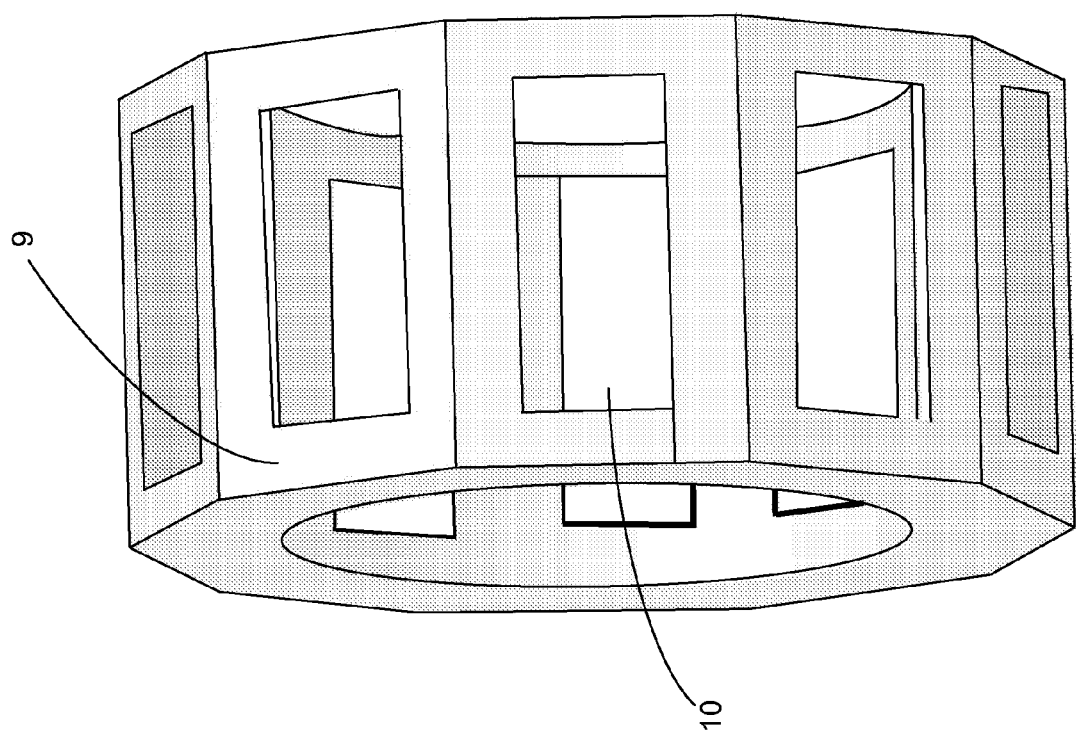
FIG. 3

FIBROUS PLANT STALK DECORTICATOR

BACKGROUND

This disclosure relates to a decorticator, a type of machine designed to separate the outer bast or bark fiber from the inner woody core of plant stalks such as hemp, flax, kenaf, jute, nettles, and other plants in a single operation, using an improved method of rapidly breaking the woody core of bast fiber stalks at very short intervals; rapidly scutching the finely broken core material from the bast fiber; and, accomplishing this action without causing mechanical damage to the bast fiber. This action is equally effective on plant stalks in wet, dry, unretted, or retted condition.

Past and present decortication machines, including but not limited to breakers, scutchers, hammermills, differential speed decorticators, and pre-disintegrators, invariably cause mechanical damage to bast fiber. This mechanical damage is commonly identified as "kink bands." Typically, the drier the stalk and lesser the degree of retting then the higher the instance of mechanical damage. Most modern decortication systems operate on dry partially retted stalks. The kink bands substantially weaken the bast fiber, thereby limiting the range of end-use applications that it may be used with. For example, when mechanically damaged bast fiber is subjected to wet processing, otherwise referred to as degumming, and additional mechanical processing such as carding, fine cleaning, or cottonization, the mechanically damaged fiber breaks into short fiber under 10 mm in length. Fiber under 10 mm in length has little value and renders attempts to add value through further processing economically unfeasible.

A decorticating machine is described in U.S. Pat. No. 2,460,488, which employs a method of decortication that includes the following components: 1) crushing rolls; 2) feed table; 3) gripping roll; 4) breaking roll; and, 5) scutching roll. The machine operates in the following manner as described below.

First, fibrous plant stalk material is fed longitudinally into two crushing rolls vertically aligned one on top of the other and made of smooth hardened metal. The crushing rolls rotate oppositely and drive the fibrous plant stalks onto a metal feed table which has a gripping roll made of hard rubber positioned above the feed table in close proximity to the feed table edge in order to hold the stalks while continuing to drive the stalks over the edge of the table into the orbit of the breaking roll and then the scutching roll.

Both the breaker and scutcher rolls have a plurality of solid metal blades extending outward longitudinally from the central shaft. The face of the blades is perpendicular to the directional flow of the fibrous materials being acted upon. The two rolls, breaker and scutcher, rotate in opposite directions and their respective blades intermesh in their respective orbital paths to a depth not greater than 1.5 inches.

The forward moving stalks are driven over the feed table edge into the orbital paths of the breaking and scutching rolls. The centers of the breaking and scutching rolls and feed table edge form an approximate 45-45-90 triangle with the ninety degree angle formed between feed table edge and the centers of the breaking and scutch rolls.

The center of the breaking roll is positioned straight out from the feed table edge relatively in line with the plane of the feed table. The orbital path of the breaking roll is down and toward the edge of the feed table. The orbital path clears the edge of the feed table by less than an inch thereby impacting the forward moving stalk bending it down approximately ninety degrees across the feed table edge.

The forward moving stalk continues into the orbital path of the oppositely rotating scutcher roll, which has an orbital path that clears the bottom of the feed table by less than an inch. The blades of the scutcher roll impact the forward moving stalk at substantially the same point of impact as the preceding impact with the breaking roll, but bending the stalk back and up at approximately ninety degrees. The method of decortication involves rapid back and forth bending which breaks, loosens, and allows the bast fiber to be cleaned of woody core without causing serious damage to the fiber. It also allows for operation on plant stalks of varying degrees of moisture content. This method has antecedent in U.S. Pat. No. 1,601,984.

Another decorticating machine is described in U.S. Pat. No. 2,162,780. In this particular decorticator, the breaking and scutching rolls are set at approximately forty five degree angles to the path of the fibrous materials, which are pulled through the breaker and scutcher rolls horizontally at a latitudinal or diagonal angle rather than longitudinally. This prior art also provides for means of arranging sections of blade in a regularly recurrent offset pattern longitudinally across the breaker and scutcher rolls, as well as for means of directing a stream of air from the central shaft of the top breaker roll from the base of the trailing faces of the breaker blades.

The previous prior art examples fail to provide or address the following points of innovation. A means of feeding and compressing a mat of plant stalks into the machine through feed belts position under and above the path of travel. A means of adjusting the angle of the feed table in such a manner that the distance between the point that the stalks clear the feed roller's grip and enter the orbit of the breaker roll can be controlled for optimal performance. A means of controlling the lateral diffusion of plant stalks between the crushing rolls and feed roller with lateral baffle plates. A means of controlling the lateral diffusion of the decorticated fiber through the zone of decortication by providing concave blade tips. A decortication element configuration consisting of a larger upper breaking roll and a smaller lower scutching roll, which results in a unique kinematic action embodied in a faster traveling lower scutcher that sweeps core from fiber. Significantly, this sweeping action may be optimized by altering the pitch point of the lower scutcher in relation to the orbit of the upper breaker resulting in lesser or greater distances between the blades of the scutcher and breaker throughout their orbital intermeshing.

SUMMARY

A first object of this invention is to provide novel pneumatic elements hereafter referred to as an "air comb" that are built into each breaking and scutching blade and capable of delivering a plurality of forceful jets of air at the point of contact with the fibrous material and throughput the orbital path from the tip or extremity of the blades in order to more effectively open fibrous materials, remove core, decrease intermeshing of blades, reduce fiber damage, increase throughput, remove moisture, prevent winding of fiber, and generally aid in material handling throughout the process of decortication.

A particular object of the air comb feature is to provide a means of delivering chilled air to enhance the effectiveness of core removal. Another particular object of the air comb is to provide a means of delivering heated air to enhance moisture elimination.

A particular object of the air comb blade is the concaved tip designed to prevent the fibrous material from escaping outside the lateral periphery of the air comb blades by providing a natural space for the fibrous material to fill into as it is acted upon during the course of decortication.

A second object of this invention is to provide a novel decortication element arrangement consisting of a upper breaking roll with a greater outer diameter than the lower scutching roll. As a result of this arrangement the lower scutching roll must travel at a proportionally faster peripheral speed than the upper breaking roll causing a unique kinematic action which can be adjusted by altering the outer diameter of the scutching roll or by moving the pitch point of the scutching roll blades in relation to the orbital path of the breaking roll blades. The overall effect of this kinematic action creates a highly beneficial cleaning action throughout the orbital intermeshing of the breaking and scutching roll blades. This kinematic action is best described as a sweeping action accompanied by additional bending and flexing of the fibrous material. The end result is cleaner fiber.

The third object of this invention incorporates or applies physically slick and hydrophobic resins, composite finishes, coatings, or materials to the air comb blades, feed table, and feed table edge as novel means to improve flow ability of fibrous materials, reduce frictions, and eliminate fiber damage.

The forth object of this invention provides for round and smooth edges on the feed table and air comb blades in order to minimize fiber damage.

The fifth object of this invention is to cut longitudinally aligned combing grooves running parallel to the path of travel of the fibrous materials in to the rounded and smoothed edges of the feed table edge and air comb blades in order to more effectively open fiber bundles and clean core.

The sixth object of this invention provides a breaker and scutcher assembly that will allow for ease of lateral extension with a central spacer and end hubs. Said arrangement also allows for multiple blade geometries such as symmetrically offset, straight, or helically spirally patterns. Said arrangement also provides for a means of locking blades in place.

The seventh object of this invention is to calibrate throughput velocity in relation to decortication impacts by means of separate variable speed drives for the feed element and decortication element.

The eighth object of this invention provides means for adjusting the angle of the feed table from 0 degrees up to 10 degrees in order to the increase or decrease the distance between the point of contact between the feed roller and the feed table in relation to the orbit of the upper breaking roll.

The ninth object of this invention provides means for adjusting the length of the feed table in order to increase or decrease the distance between the edge of the feed table and the orbit of the breaking.

The tenth object of this invention provides a novel feed element consisting of lower belt and upper belt which compress plant stalks into crushing rolls and continue to feed fibrous material over a feed table and under a gripping feed roll thereby creating a uniform continuous mat of material to be acted up in the decortication element.

The eleventh object of this invention provides a lateral baffle or guide between the crushing rolls and through the gripping feed roll in order to compress and guide the fibrous material into the action of the decortication elements.

BRIEF DESCRIPTION OF THE DRAWINGS

It is possible to thoroughly understand this invention and its benefits by referring to the following description of operating parts in relation to the drawings and subsequent explanation of the preferred method of operation.

FIG. 3 shows a means of constructing a polygonal rim segment for the breaking and scutching rolls with exterior ports and channels to the hollow interior.

DETAILED DESCRIPTION

Figure 1:
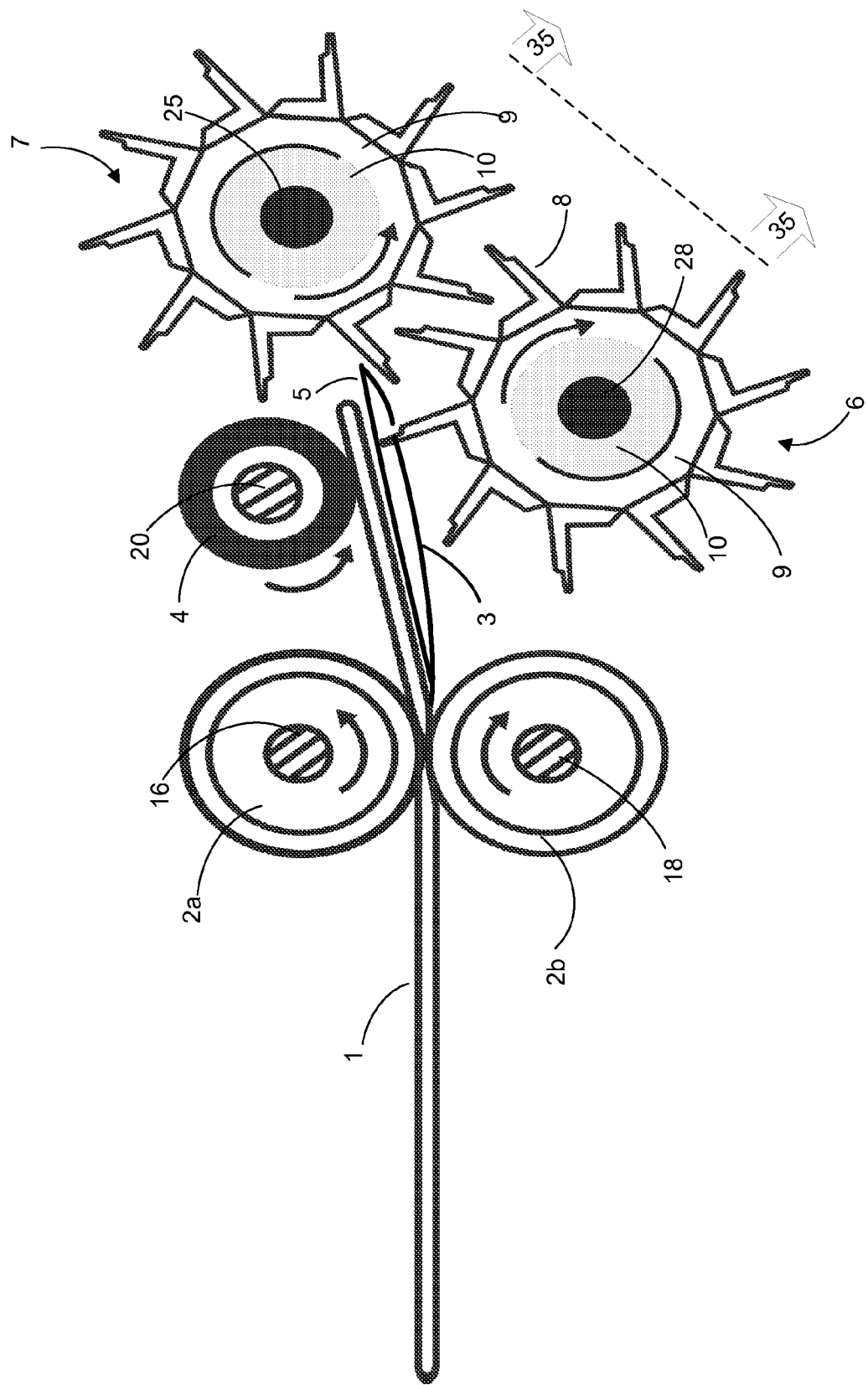
FIG. 1 is a side elevation view of a fibrous plant stalk being driven through a two dimensional side perspective of the decortication element.

The machine illustrated in FIGS. 1-2 and FIGS. 8-13 is mounted within a pair of solid upright frame structures indicated at 14 (FIGS. 8-13). The frame structures 14 are adequately spaced to accommodate the width of the feeding mechanism 2a, 2b, and 4; and decortication elements 5, 6, and 7. The machine is supported by triangular legs 15. There is an input port at 13 and output port at 35. It should be readily evident from these drawings that said invention essentially represents a box which may be framed, mounted, and supported by a multitude of structural means. Specifically such box designs are ideal for implementation into forage and combine harvesting equipment.

There are a multitude of means available for feeding the stalks into the influence of the crushing rolls 2a and 2b. The machine illustrated in FIGS. 8-13 is fed by manual means via input port 13.

Figure 11:
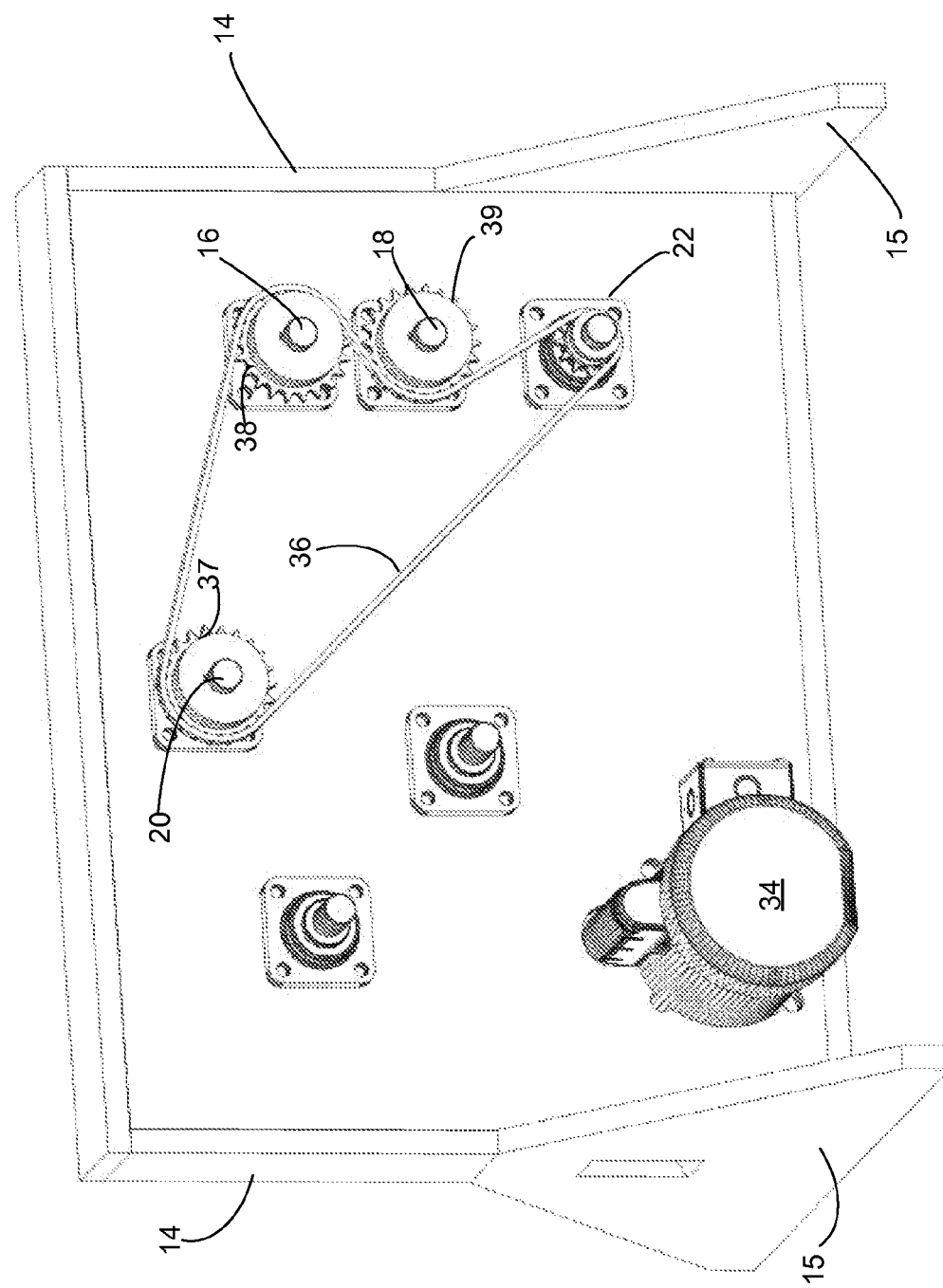
FIGS. 11, 12, and 13 are exploded perspectives of the opposite side from the exterior to the center of the machine.
Figure 12:
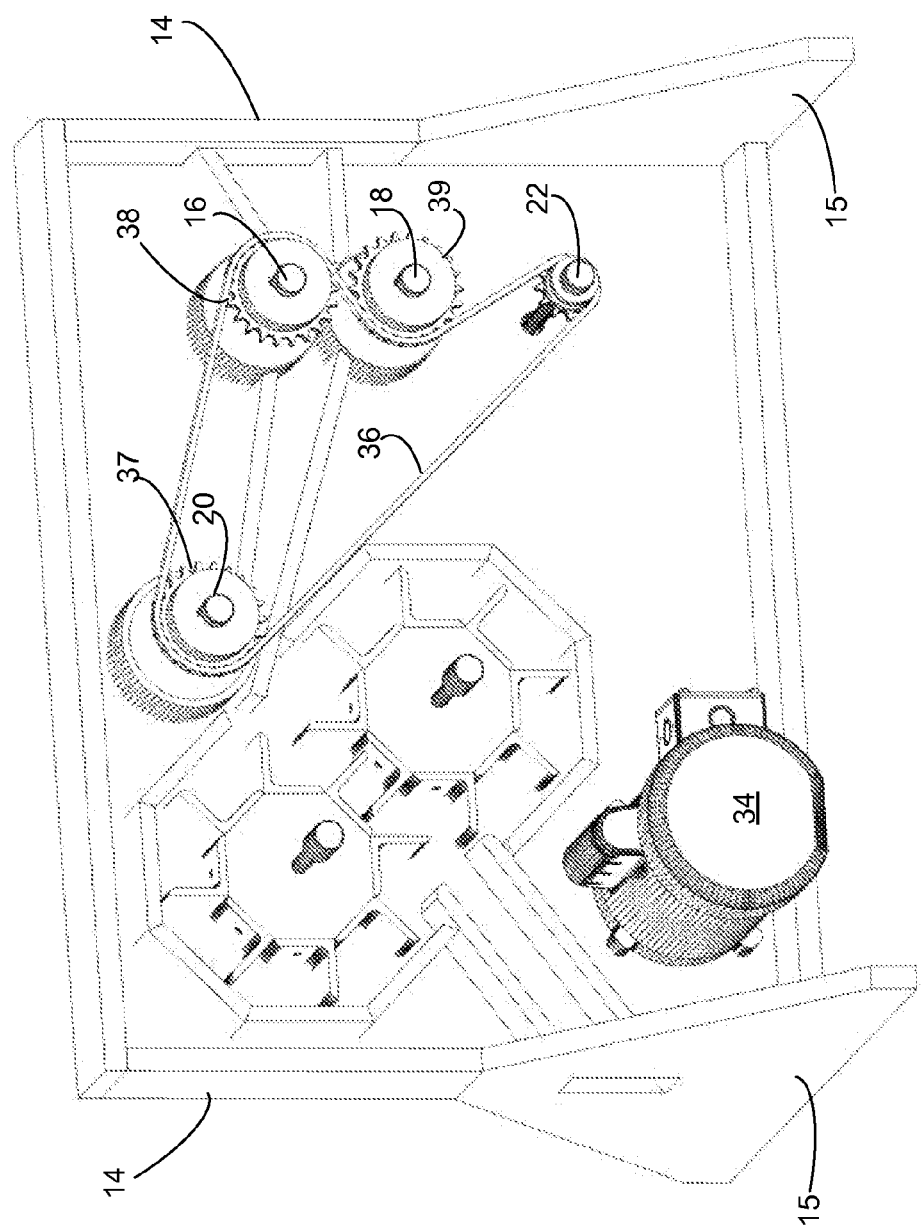
Figure 13:
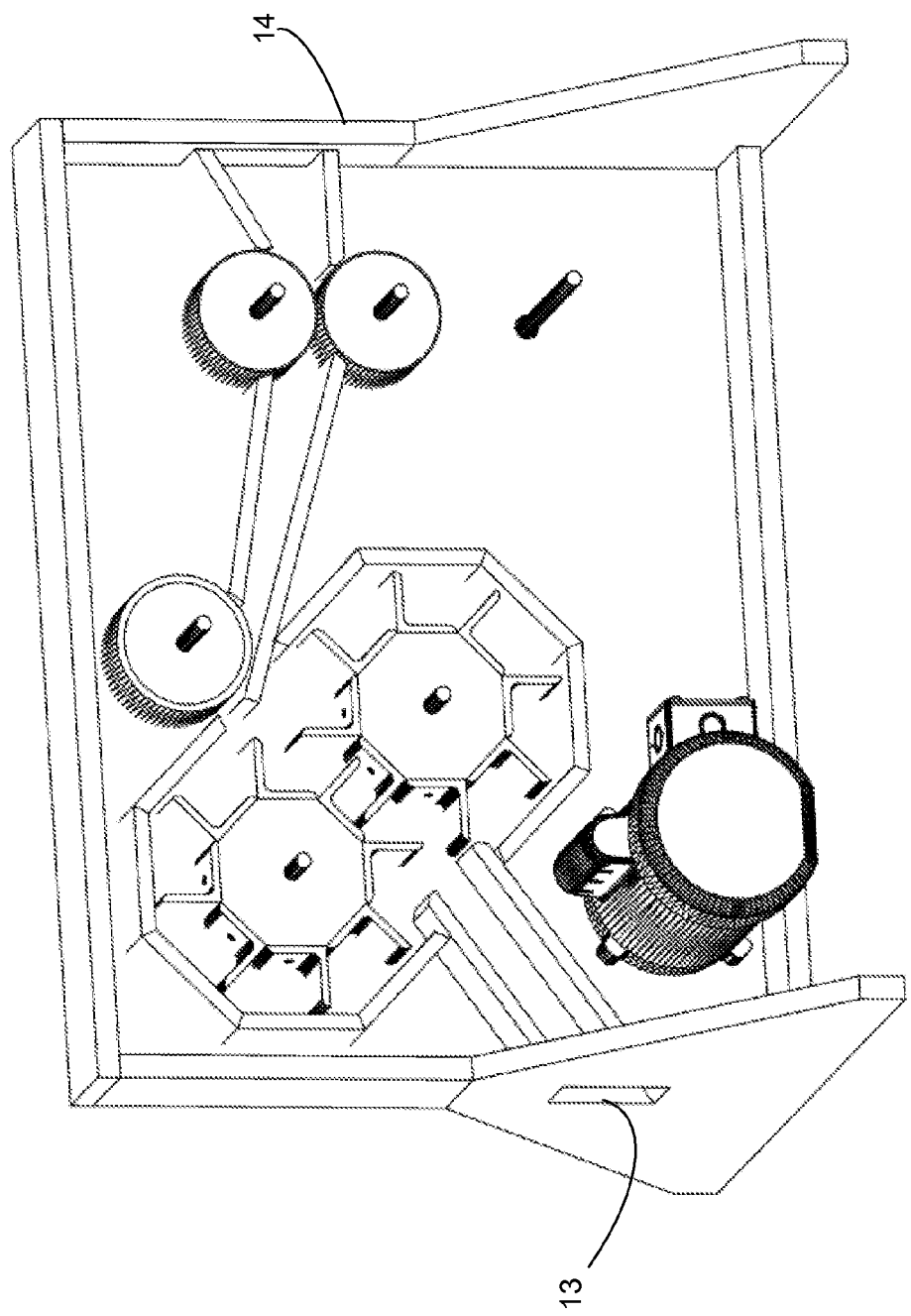

FIG. 1 shows fibrous plant stalk 1 being fed into the oppositely rotating crushing rolls 2a and 2b, which are mounted on shafts 16 and 18. In the drawings, FIGS. 8 and 9, the shafts 16 and 18 fit into bearings 17a-17b and 19a-19b that are supported in structural frame 14. FIGS. 11 and 12 show a manner in which crushing rolls 2a and 2b are driven in tandem with gripping roll 4 by means of drive shafts 16, 18, and 20, which attach to their respective sprockets 37, 38 and 39 are propelled by drive shaft 22, which attaches to sprocket 37, and drives chain 36.

In the preferred embodiment of this invention, which is not shown in the drawings, but readily understandable, bearings 17a and 17b should be attached to suitable structural guides on both sides of the structural frame 14. These structural guides support bearings 17a and 17b and allow vertical movement. These structural guides will allow suitable pressure yielding devices such as coil springs to be mounted in the structural frame 14 connected to bearings 17a and 17b in order to compress crushing roll 2a into crushing roll 2b.

In FIG. 1, fibrous plant stalk 1 is crushed between crushing rolls 2a and 2b as it is propelled forward by the counter-clockwise rotation of crushing roll 2a and the clockwise rotation of crushing roll 2b. This flattening action serves to create a uniform layer of fibrous stalk material and begins to break down the bonds between the bast fiber and woody core. In addition, the squeezing action removes moisture from wet plant stalks.

Upon exiting the influence of crushing rolls 2a and 2b, fibrous plant stalk 1 is received on feed table 3 which is relatively thin and made of smooth metal or composite material. Feed table 3 is supported in structural frame 14. It is beneficial to apply a slick hydrophobic coating or finish to feed table 3 in order to reduce friction and improve flow ability of fibrous plant stalk 1. It is also beneficial to perforate the surface of feed table 3, which similarly reduces friction and improves flow ability by providing moisture an escape route and air a means of blowing up through the holes due to the fanning action of scutching roll 7 and its attendant air combs 8.

In the preferred embodiment of this invention gripping roll 4 is made of hardened rubber, polyurethane, or similar gripping polymer and positioned directly above feed table 3 and directly adjacent to crushing rolls 2a and 2b along the path of travel of fibrous plant stalk 1. This compact design enables fibrous plant stalk 1 to be held under the dual influence of crushing rolls 2a and 2b, as well as, gripping roll 4 for as long a duration as possible thereby minimizing the chance of fibrous plant stalk 1 slipping into the decortication elements.

This design also lends itself to uniquely optimized working diameters for crushing rolls 2a and 2b based on feed velocity and in relation to the diameter of scutching roll 7 and breaking roll 6.

In the drawings, gripping roll 4 is mounted on shaft 20, which is supported in structural frame 14 by bearings 21a and 21b. However, it is the preferred embodiment of this invention that gripping roll 4 also be mounted on vertically moveable bearings attached to structural guides that are built into structural frame 14 in order to engage a pressure applying device, such as a spring coil. Such a pressure device would be mounted to structural frame 14 and attached to bearings 21a and 21b, in order to compress gripping roll 4 against feed table 3 and firmly hold fibrous plant stalk 1. Gripping roll 4 rotates counter-clockwise at a slightly faster velocity than crushing rolls 2a and 2b, pulling the stalk forward and not allowing it bunch up as it is fed into the influence of the decortication element.

Upon exiting the grasp of gripping roll 4, fibrous plant stalk 1 is propelled forward over feed table edge 5 and into the orbital paths of breaking roll 6 and then scutching roll 7. Feed table 3 is extendable and retractable allowing feed table edge 5 to be moved in and out to accommodate fibrous plant stalks of varying stalk diameter, flexibility, and brittleness. In general feed table edge 5 does not exceed the furthest circumferential point forward of gripping roll 4. This tangential point is perpendicular to feed table 3. The distance between feed table edge 5 and the peripheral orbits of breaking roll 6 is adjustable within a range of 5 millimeters to 44 millimeters.

Breaking roll 6 and scutching roll 7 may be arranged in numerous manners with varying diameters and numbers of blades. However in the preferred embodiment of this invention, breaking roll 6 and scutching roll 7 are the same size and have the same number of blades. As can be seen in FIGS. 1-2 and FIGS. 8-13, this symmetrical design necessitates that breaking roll drive shaft 28 intersect with the plane of feed table 3 and that scutching roll drive shaft 25 intersect with a tangential line dropped down from rounded feed table edge 5 that is relatively perpendicular to the directional flow of fibrous plant stalk 1 and in relative proximity to and behind feed table edge 5. Such an arrangement of working parts forms an approximate 90-45-45 degree triangle between feed table edge 5, breaking roll drive shaft 28, and scutching roll drive shaft 25. The 90 degree angle occurs between feed table edge 5 and break roll 6 and scutch roll 7. This arrangement also insures that breaking roll 6 and scutching roll 7 impact fibrous plant stalk 1 at substantially the same location. As a result of this action fibrous plant stalk 1 is repeatedly bent back and forth causing the core to be thoroughly shattered and removed from fibrous plant stalk.

Figure 8:
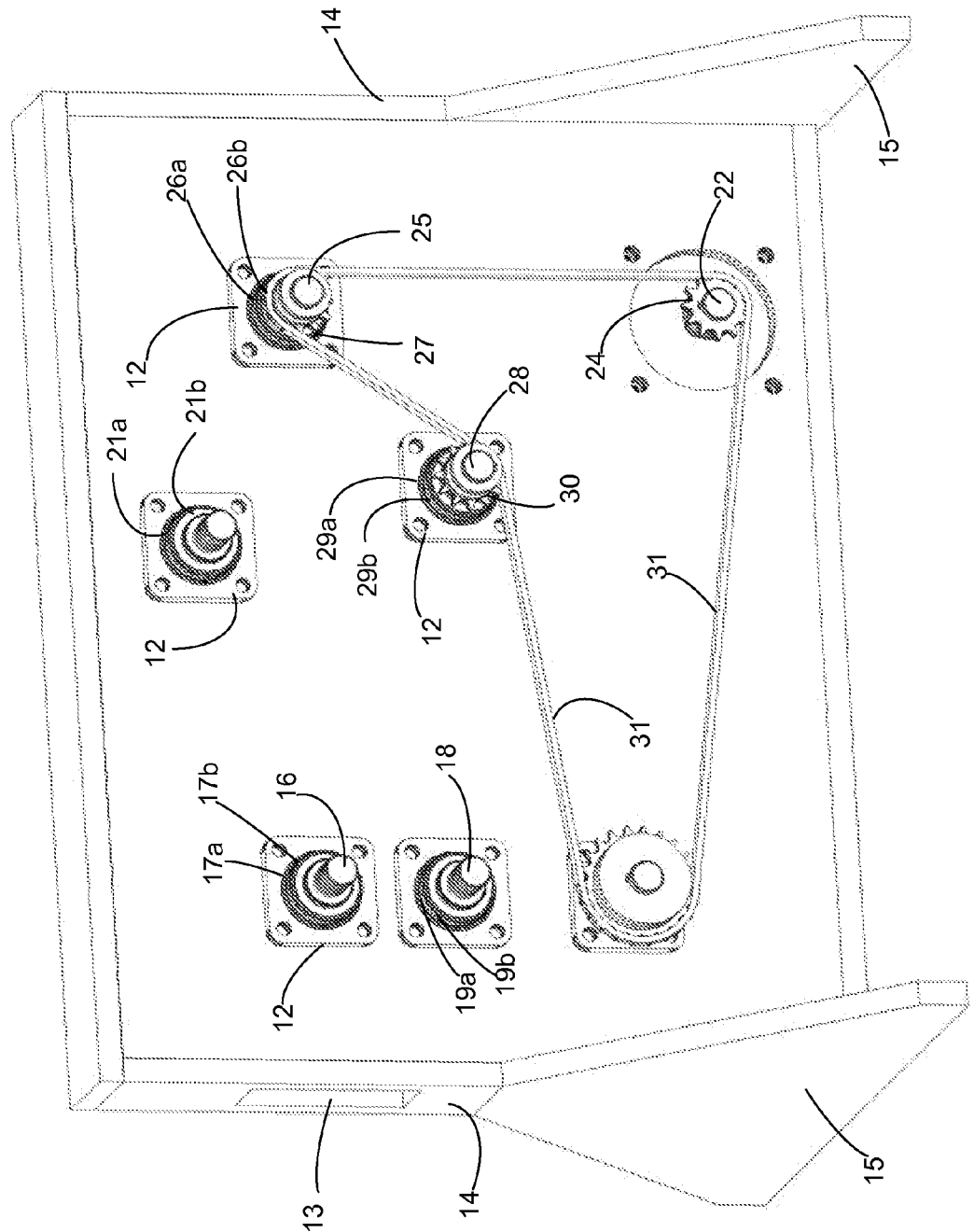
FIGS. 8, 9, and 10 are exploded perspectives of one side from the exterior to the center of the machine.

FIGS. 8 and 11 show means for securing breaking roll 6 and scutching roll 7 to both sides of structural frame 14. Specifically, drive shafts 25 and 28 correspond to breaking roll 6 and scutching roll 7 respectively are secured in bearings 26a-26b and 29a-29b respectively. Both sets of bearings, 26a-26b and 29a-29b, may be mounted on swivels that are secured to structural frame 14, in order to better control the angle of impact and depth of intermeshing between air comb blades 8 on the opposing rolls 6 and 7.

Figure 2:
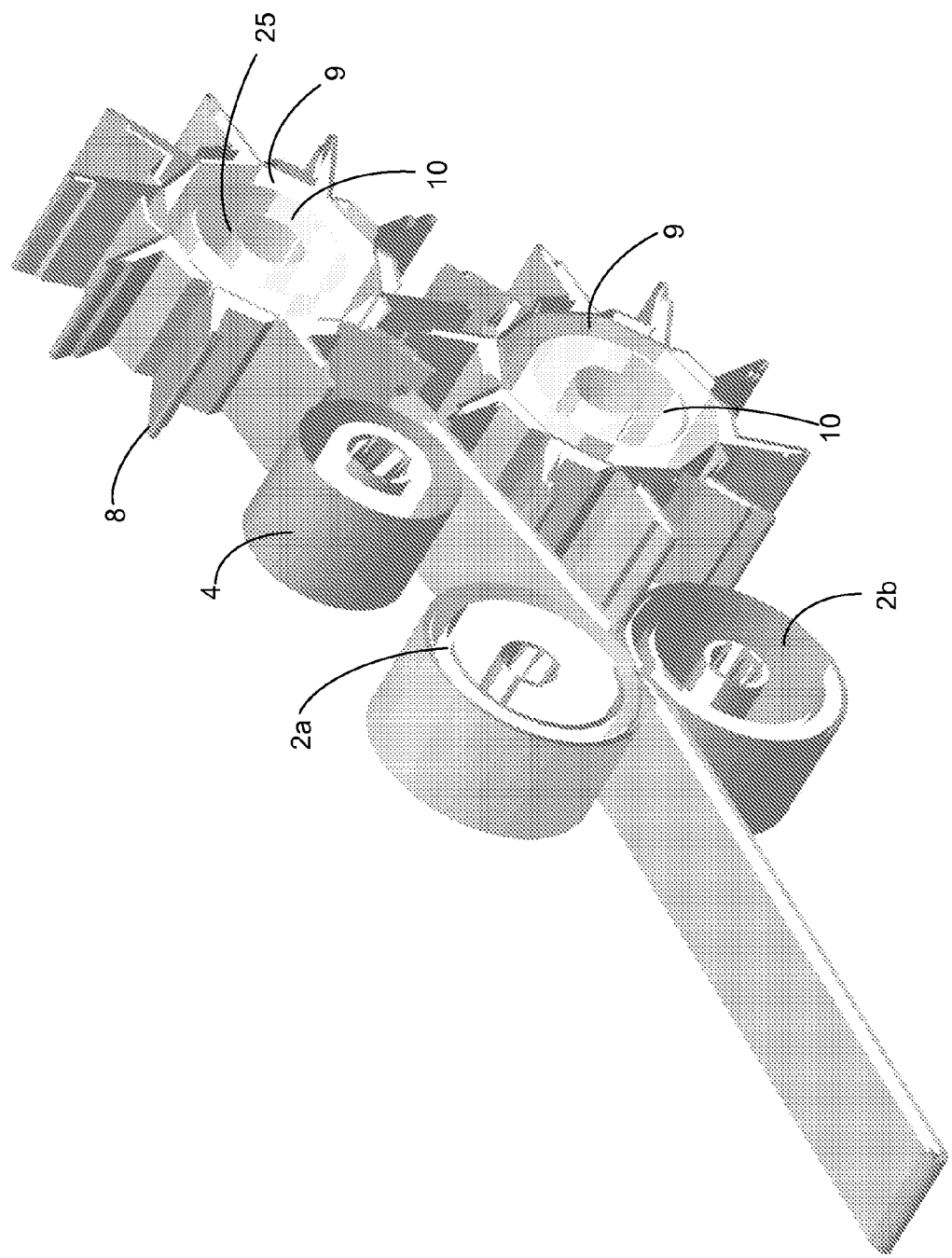
FIG. 2 is a three dimensional obtuse overview of the same operational configuration of the feed mechanism and decortication element.
Figure 4:
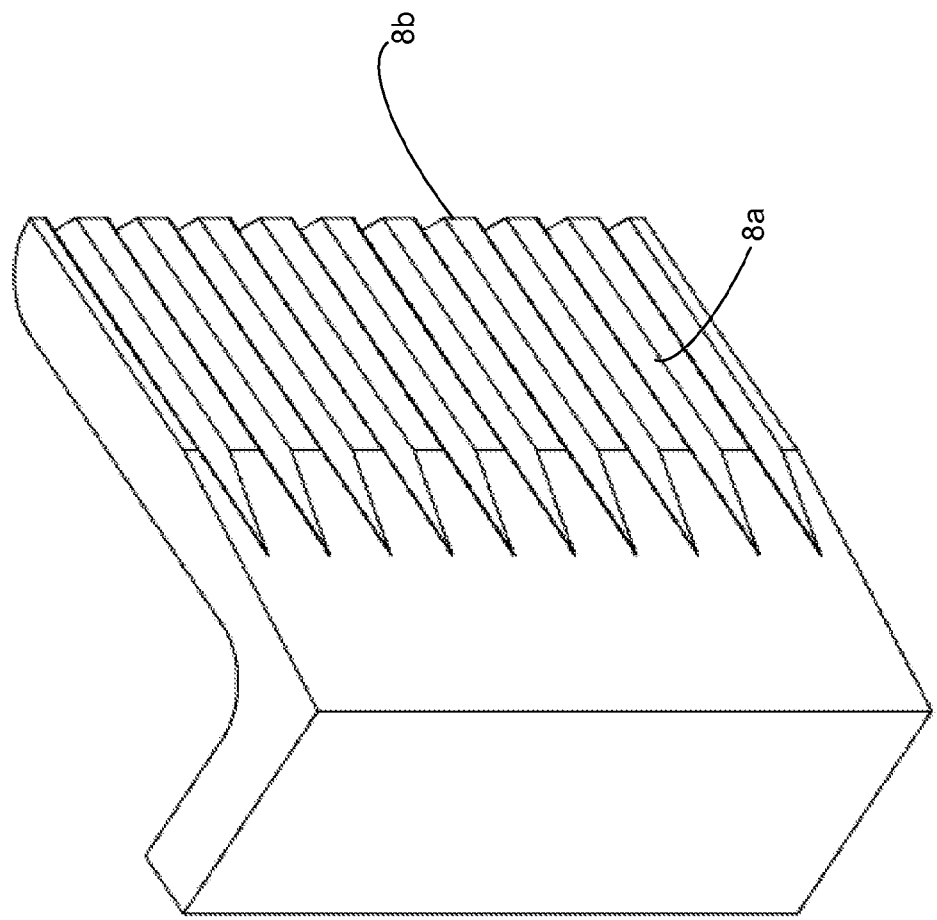
FIGS. 4, 5, 6, and 7 are perspective views of an air comb.
Figure 5:
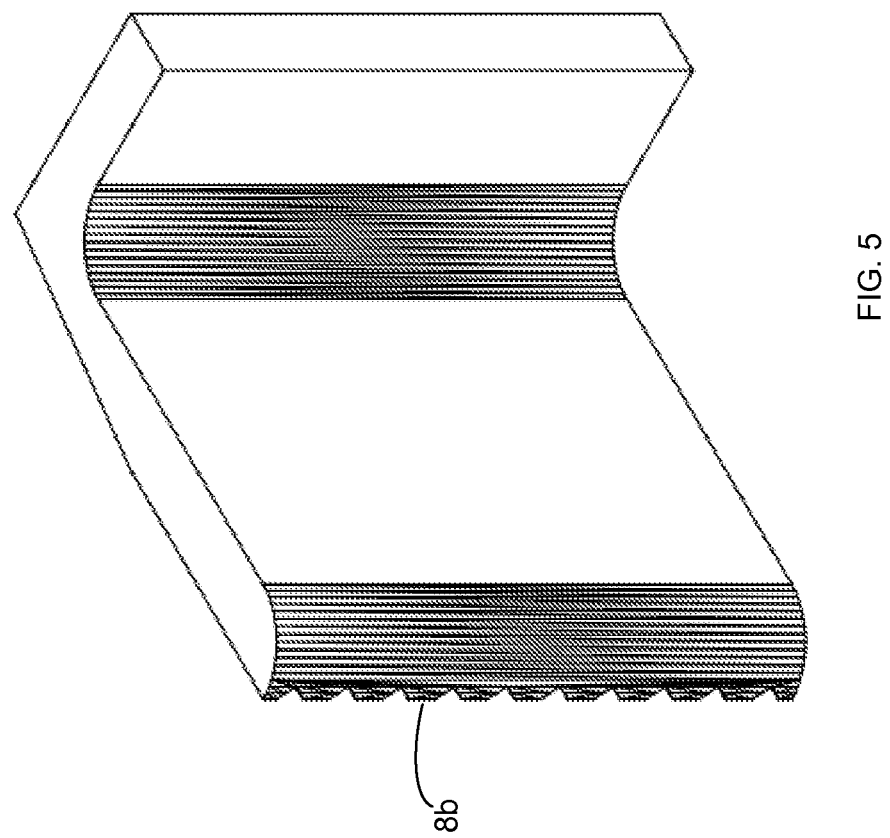
Figure 6:
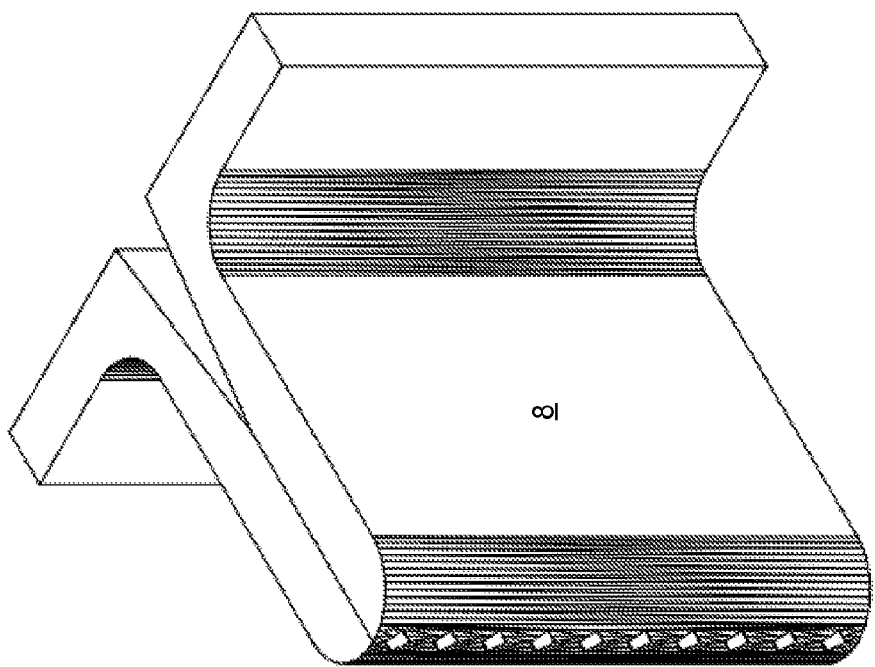
Figure 7:
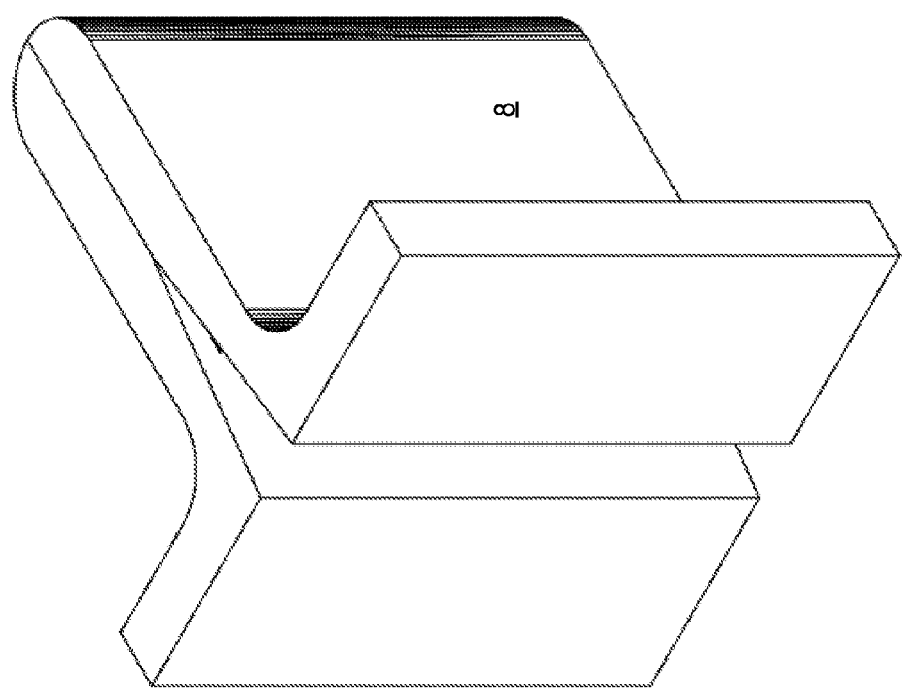

FIGS. 1 and 2 depict breaking roll 6 and scutcher roll 7 with a plurality of blades 8 of special construction, hereafter referred to as air combs. The preferred design for these air combs is illustrated in FIGS. 4-7. FIGS. 4 and 5 show a single L-shaped piece of machined metal with grooves cut into the back exterior side 8a and a rounded inner tip at the top 8b. When two L-shaped pieces are placed back to back the resulting composite piece is an air comb 8 as shown in FIGS. 6 and 7.

Air combs attach to breaking roll rim segment 9 and scutching roll rim segment 9, which are shown in FIGS. 1 and 3. FIG. 3 also shows the ports 10 into which air combs 8 plug into rim segments 9. FIG. 3 shows how these ports open into hollow shaft interior 11 which is also depicted in FIG. 1. Compressed air is delivered to hollow shaft interior 11 via drive shafts 25 and 28 on the opposite side as the drive mechanisms, which in the present drawings corresponds to FIG. 11. This air may be chilled or heated. In the preferred embodiment of this invention the compressed air is channeled through volume reducing grooves which effectively accelerate the air stream into jet blasts more effectively opening fiber bundles and removing core material. The air combs also reduce the angles of impact and degree of intermeshing between the blades of breaking roll 6 and scutching roll 7.

Consequently, less impact force is required to remove the core from flattened and decorticated fibrous stalk material, which minimizes mechanical fiber damage to recovered fiber. The "air comb" as described in FIGS. 4-7 is an entirely novel device. However, it is not limited to this design. An air comb 8 may be simply constructed from a typical air knife or similar volume reducing jet nozzle type device that is capable of delivering pressurized air at the point of contact with the fibrous material and throughout the orbital path from the tip or extremity of the blades. Such air knives and nozzles are available on the open market. To make a suitable air comb with one of these devices one would reinforce the forward travelling side of said device with a suitable hardened material such as metal or composite to form a blade for breaking and scutching operations. An air knife, jet, or plurality of jets reinforced is such a manner is novel and the proposed application of such a device is novel.

Another feature with benefits that is not shown in the present drawings is combing grooves aligned parallel to the directional flow of fibrous plant stalks cut into feed table edge 5 and air comb 8. Combing grooves facilitate the opening of fiber bundles, which improves core removal.

Feed table edge 5 and air comb 8 are all rounded and smooth finished, even with combing grooves. The surfaces of these parts also benefit from the application of slick hydrophobic coatings and finishes that reduce friction and improve the flow ability of fibrous plant stalks. These design measure allow fiber bundles to slip across impacting surfaces reducing the potential for mechanical damage. Clean bast fiber is ejected from the decorticator through output port 35.

A means of making rim segment 9 is shown in FIG. 3. Rim segment 9 is manufactured from a cylinder or symmetrical polygonal shaft or pipe composed of metal or suitable hardened composite material. Rim segment 9 is constructed with ports 10 in the outer surface to accept air comb blades 8. These ports breach a hollow shaft interior 11 and permit air to enter the air comb 8. Rim segment 9 is attached to the drive shafts 25 and 28 at the lateral ends of rim segment 9 by means of solid plate 12, FIG. 8 thereby creating sealed hollow shaft interior 11 which is capable of accepting pressurized air.

Rim segment 9 may be constructed as a single segment machine as depicted in the present drawings or rim segment 9 may be interlocked with multiple rim segment 9 pieces to create breaking and scutching rolls 6 and 7 of varying widths. When rim segment 9 is interlocked to form a multi-segment roll it is possible to arrange the blades in patterns, such as straight lines or as recurring offset patterns, like chevrons or helical spirals.

Figure 9:
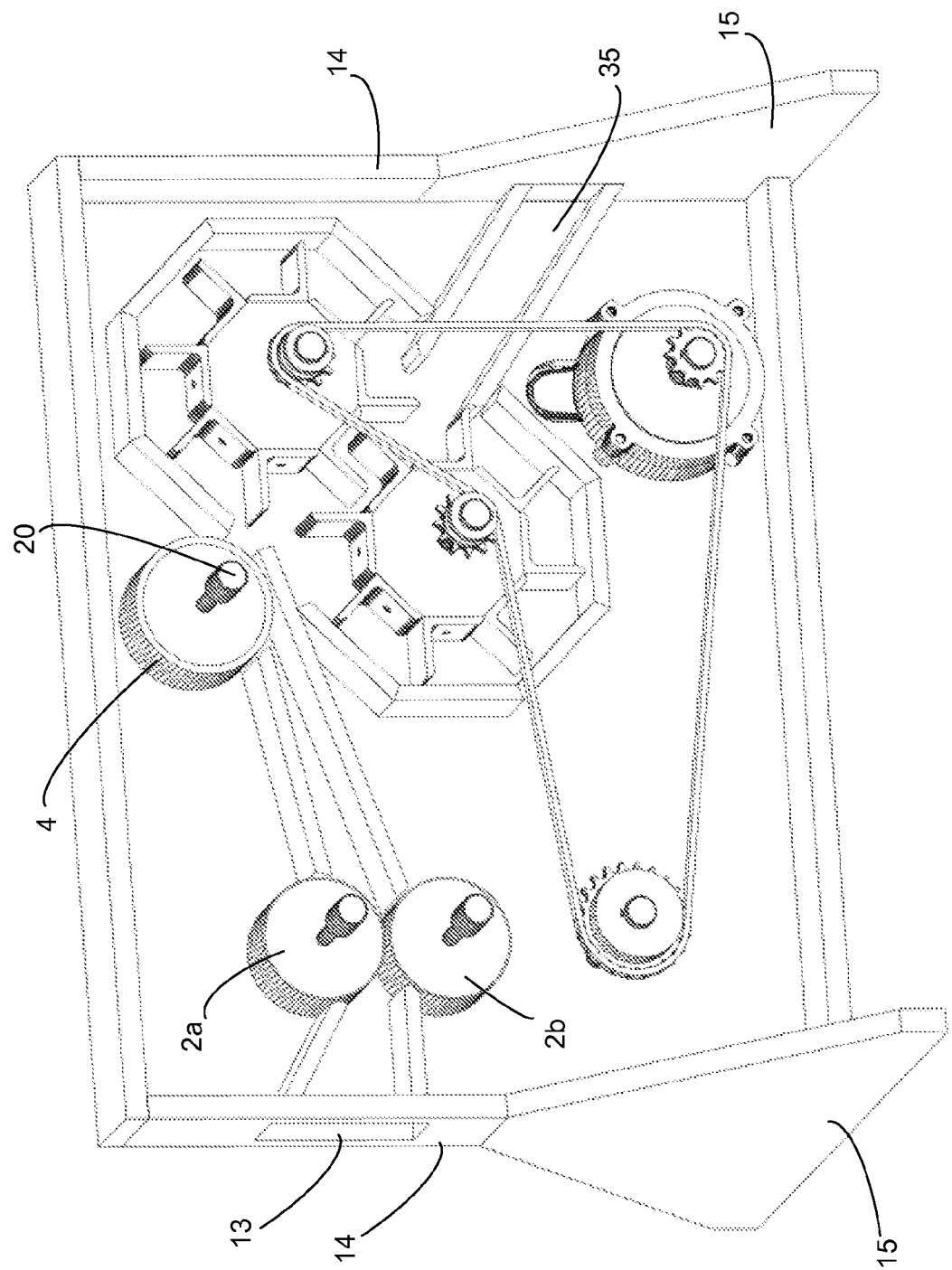
Figure 10:
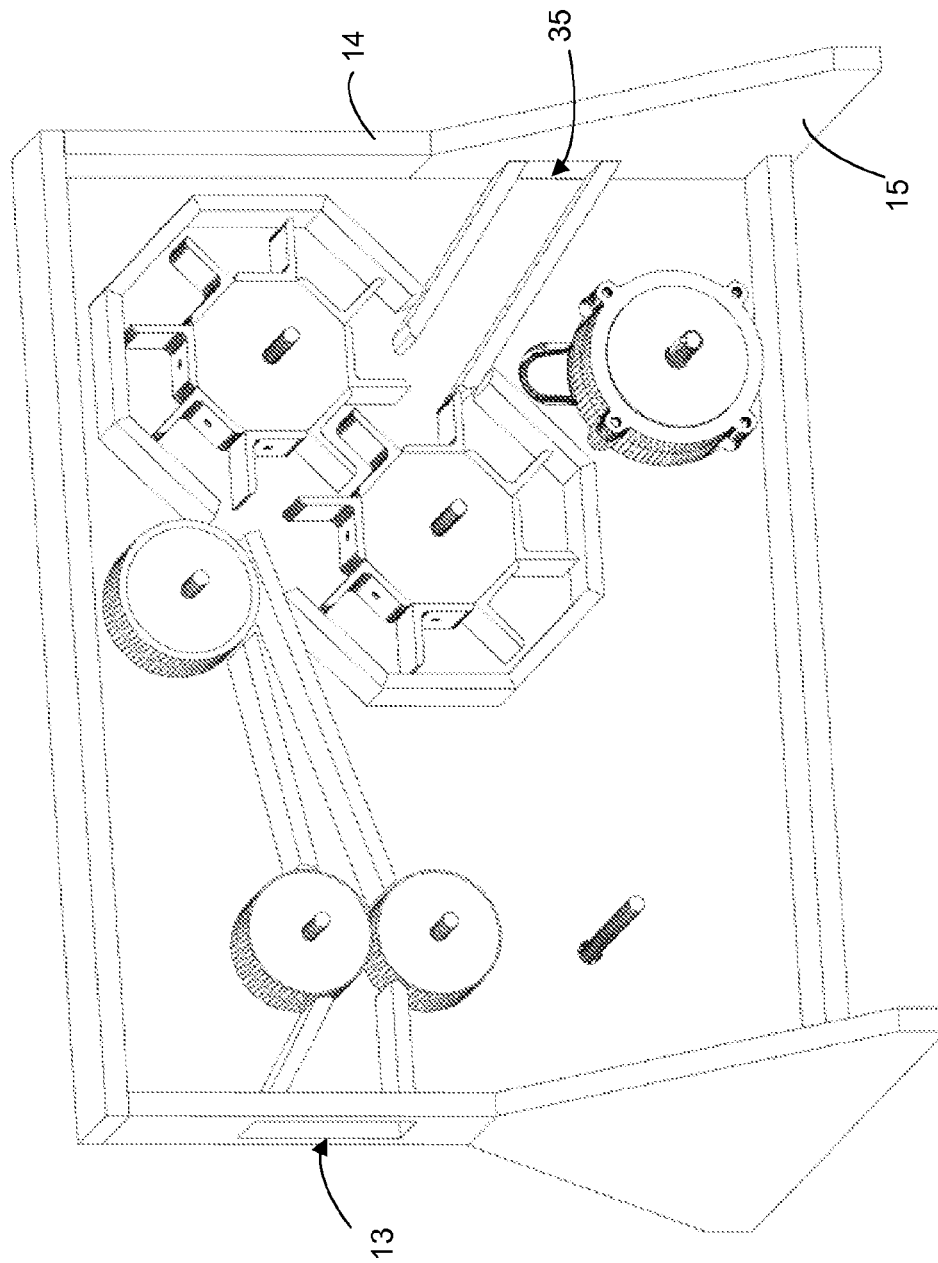

Means for propelling breaking and scutching rolls 6 and 7 are illustrated in FIGS. 8 and 9. Electric motor 34 drives chain 31 which loops around sprockets 27 and 30 propelling drive shafts 25 and 28 which correspond to breaking roll 6 and scutching roll 7 respectively. Chain 31 also drives sprocket 24 propelling drive shaft 22, which drives crushing rolls 2a and 2b as well as gripping roll 4.

Figure 14:
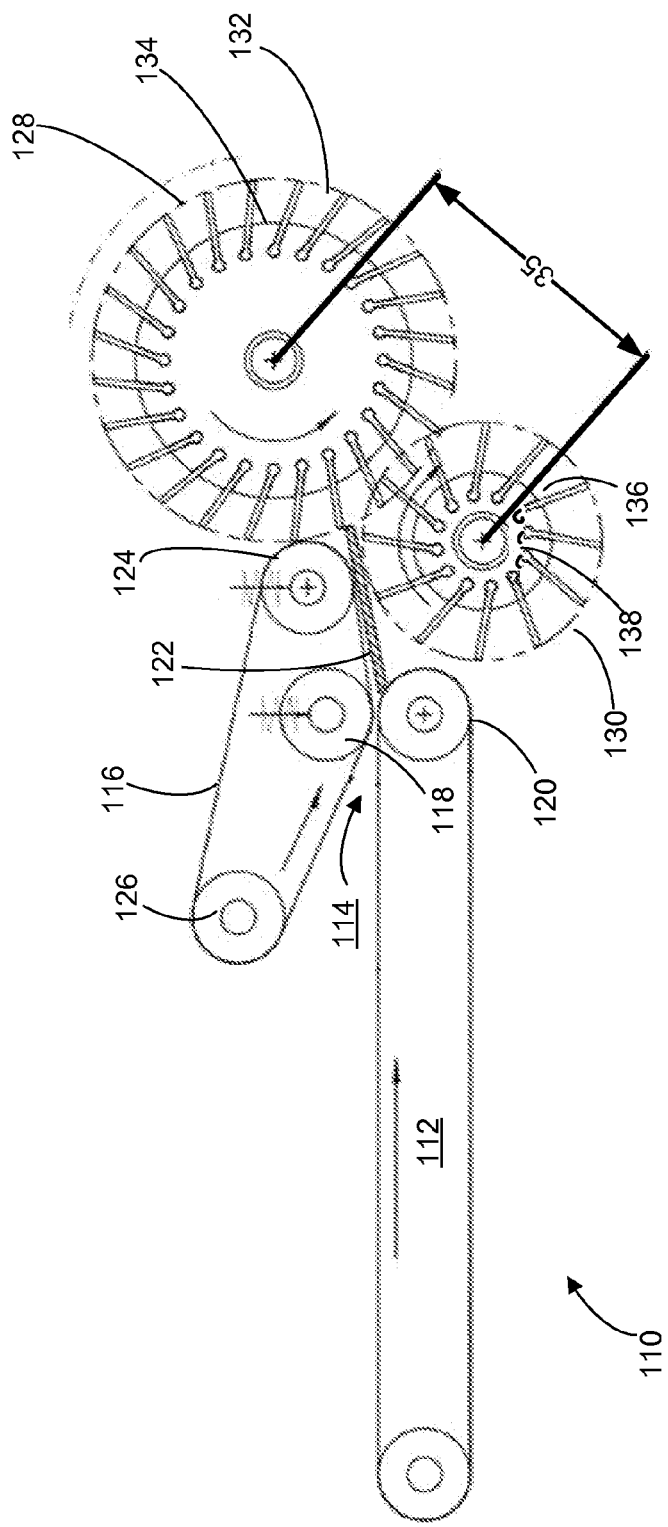
FIG. 14 is a side view of a fibrous plant stalk decorticator in accordance with a preferred embodiment of the present invention.

Referring to FIG. 14, system 110 includes a conveyor 112 for introducing fibrous plant stalks to compression zone 114. Compression zone 114 is bound by conveyor 112 and belt 116. Belt 116 may be a cogged drive or power transmission belt and be routed over rollers 118, 124 and 126. Roller 118 and roller 120 partially define the paths of belt 116 and conveyor 112 respectively and act as crush rollers to further compress the plant stalks fed to system 110. This action creates a uniform mat of fibrous plant stalk. Beyond the crush rollers, the fibrous plant stalks are directed along a feed table 122. Feed table 122 may be positioned in a fixed manner relative to breaker 128 and skutcher 130. In other embodiments, feed table 122 may be adjustable to allow an operator to adjust the angle at which the fibrous plant stalks are introduced to the blades 132 on breaker 128. Blades 132 are coupled to hub 134 of breaker 128.

Each of breaker 128 and scutcher 130 are provided with a plurality of blades for impacting the fibrous plant stalk. Scutcher 130 is provided with blades 136 coupled to hub 138. In particular, the blades 132 and 136 may overlap such that the fibrous plant stalk is bent back and forth as it passes through system 110. Also, the overlap of blades 132 and 134 results in a stretching action as the tips of blades 132 and 136 are raked across the fibrous plant stalk. Upon exiting the region of overlap between breaker 128 and skutcher 130, the fibrous plant stalk is directed through a discharge area 35 oriented perpendicular to a plane that is parallel to the axis of both breaker 128 and skutcher 130.

Figure 15:
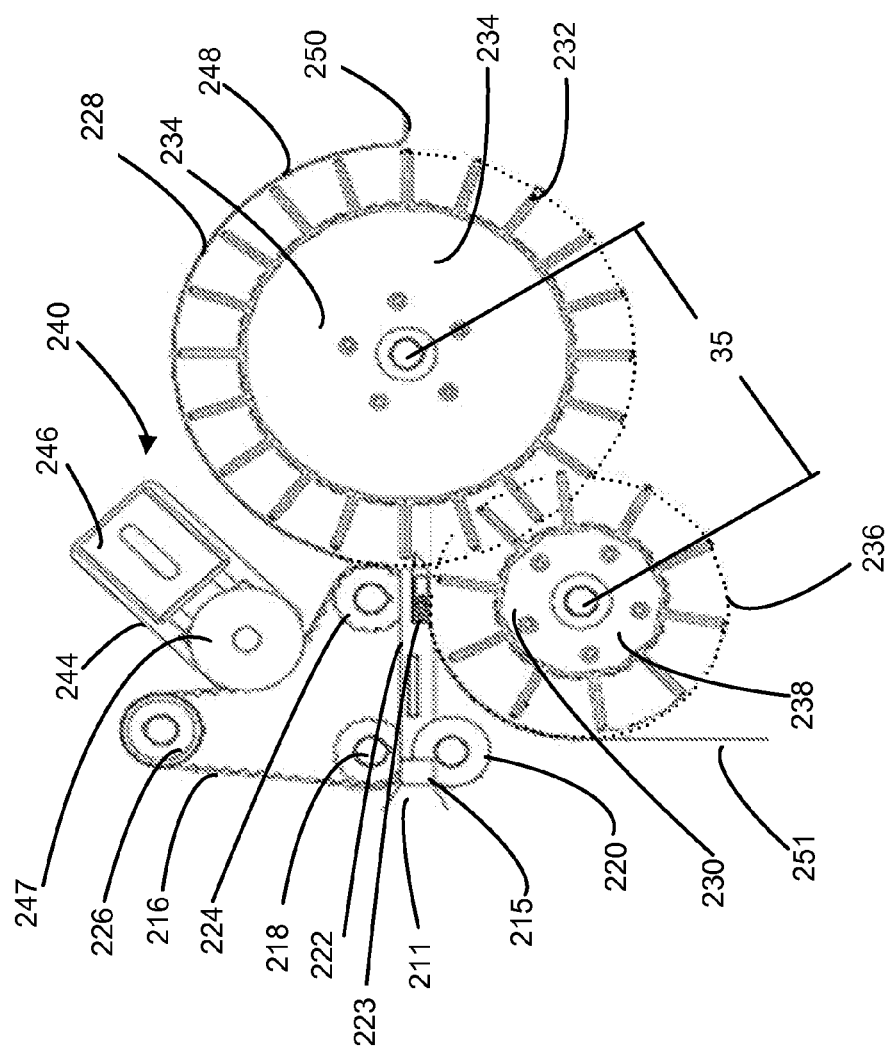
FIG. 15 is a side view of another fibrous plant stalk decorticator in accordance with a preferred embodiment of the present invention.
Figure 16:
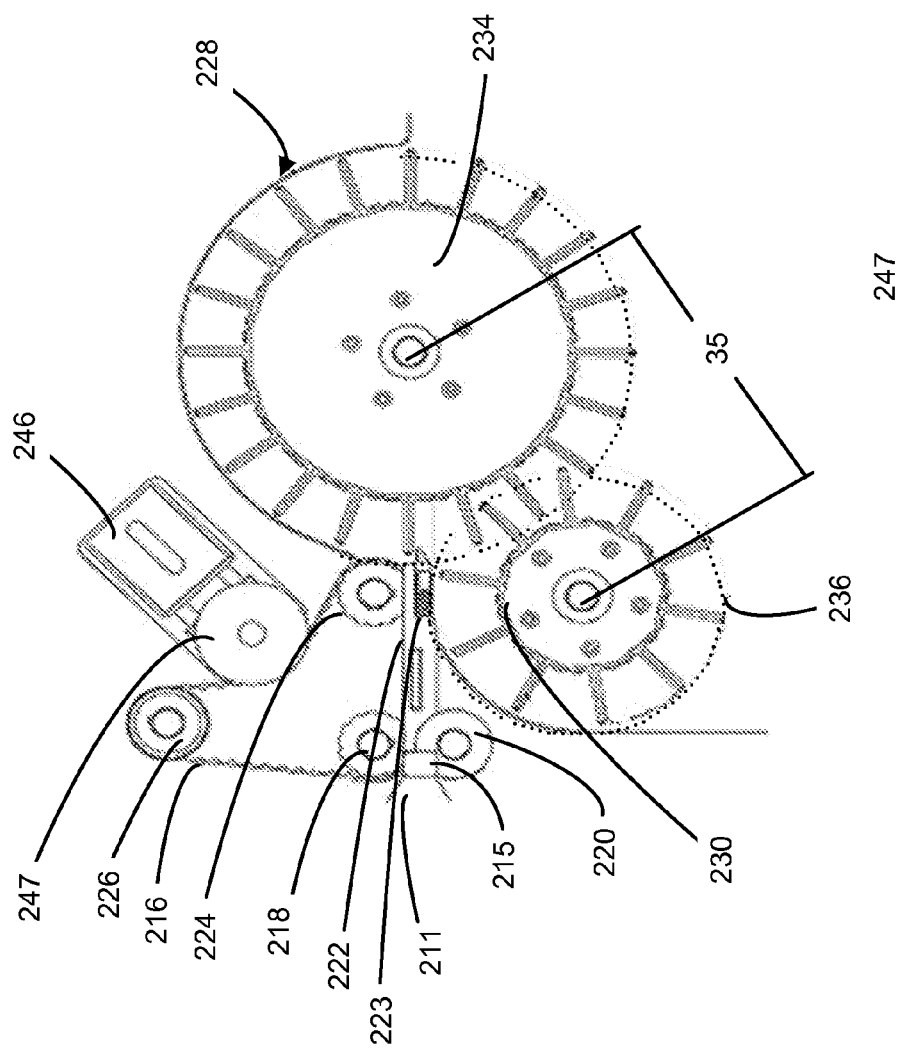
FIG. 16 is a side view of another fibrous pant stalk decorticator having an adjustable feed table in accordance with a further preferred embodiment of the present invention.

FIGS. 15 and 16, depict a fibrous stalk decorticator with an adjustable feed assembly 211, large breaker 228, and small scutcher 230. Breaker 228 is composed of air comb blades 232 attached to hub 234, whereas scutcher 230 is composed of air comb blades 236 attached to hub 238. Based on this breaker and scutcher configuration, the gearing drive ratio between scutcher 230 and breaker 228 must be 2:1.

Feed table 211 can be seen in two positions. In FIG. 15 it is shown flat or straight on, while in FIG. 16 it is shown at an 8 degree angle of incline. The range of adjustability will fall within the range of 0 degrees to 10 degrees. Feed table 222 is composed of spacers 223 which may be removed and inserted as determined by machine operator for the purpose of shortening or lengthening the space between the edge of feed table 222 and the orbit of breaker 228.

Frame 210 encases the fibrous plant stalk decorticator. Baffles 248, 250, and 251 protect the inside and direct shattered core to the bottom of the decorticator.

Fibrous plant stalks enter the machine at the belt fed assembly 211. Upon entry fibrous plant stalks are flattened over rollers 218 and 220. Roller 218 is part of feed belt assembly 211. Rollers 218 and 224 are fixed to the structural frame by means suitable for applying pressure downward. Each roller 218 and 224 is capable of traveling up or down independent of one another by 0.5 inch. As fibrous plants stalks enter the belt fed assembly 211, lateral baffle guide 215 prevents flattened fibrous material from laterally spilling over the edges of feed table 222. Feed belt assembly 211 consists of feed belt 216 which is driven by roller 226. Feed belt 216 is a cogged timing belt constructed of polymer such as polyurethane that provides gripping action. As previously described rollers 218 and 224 provide downward pressure and are capable of traveling up and down 0.5 inch. Rollers 218 and 224 are cogged. Tensioner 240 is composed of shafts 244, pressure device 246, and roller 247. The purpose of tensioner 240 is keep feed belt 216 tight.

Figure 17:
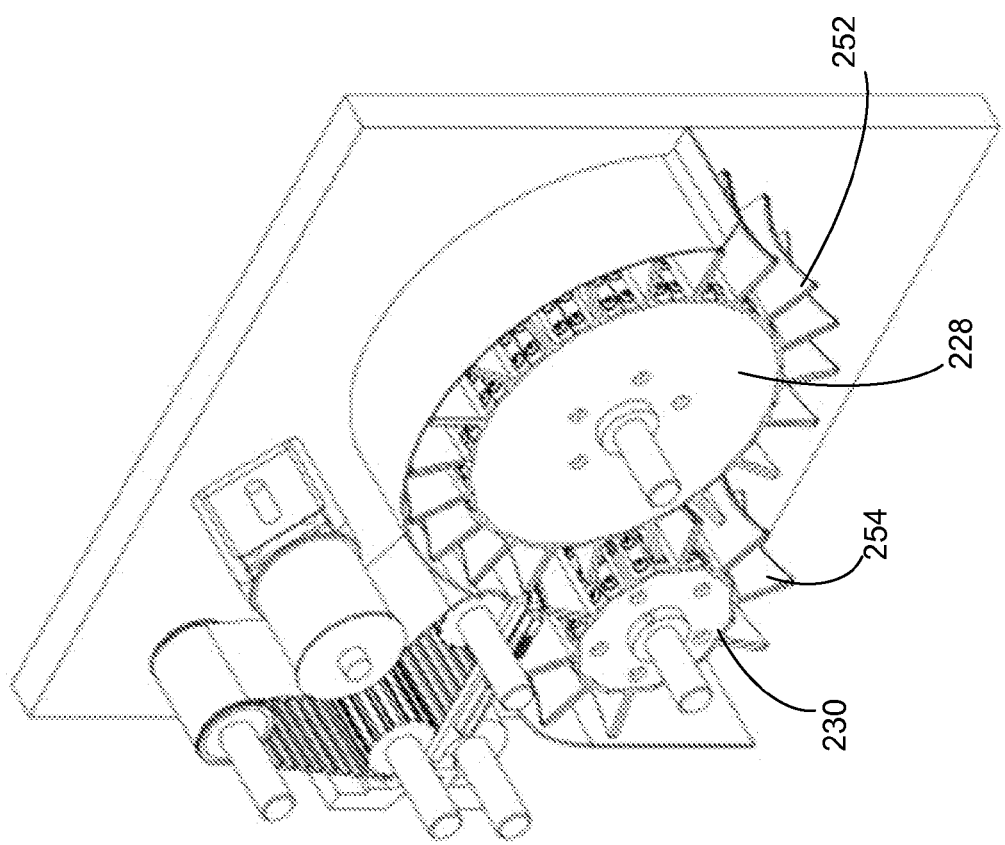
FIG. 17 is a perspective view of a fibrous plant stalk decorticator in accordance with a further preferred embodiment of the present invention.

FIG. 17 shows the concaved tips for air comb blades 252 and 254 on both the upper breaker 228 and lower scutcher 230.

Figure 18:
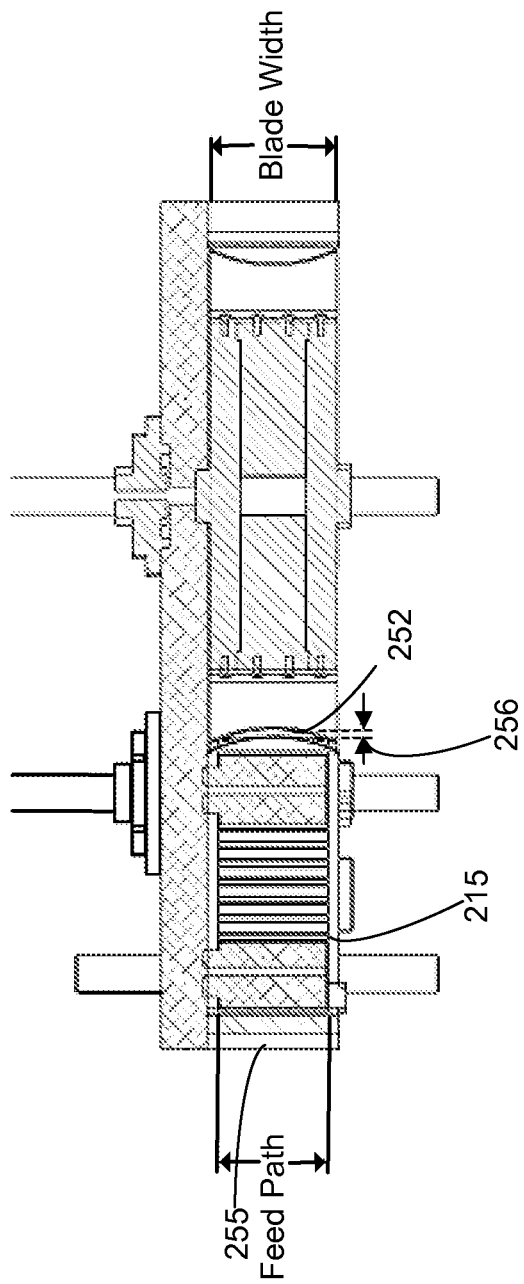
FIG. 18 is a top view perspective of a fibrous plant stalk decorticator in accordance with a further preferred embodiment of the present invention.

FIG. 18 is a view from the above the fibrous plant stalk decorticator depicting feed table edge 255 inversely contoured to match the concaved air comb blade tip 252. Lateral baffle 215 is also depicted in FIG. 18. It will be noted that air comb blade 252 exceeds the width of feed path 256. This extra spacing on the lateral periphery of feed path helps to contain the material flow and prevent lateral spill over.

Figure 19:
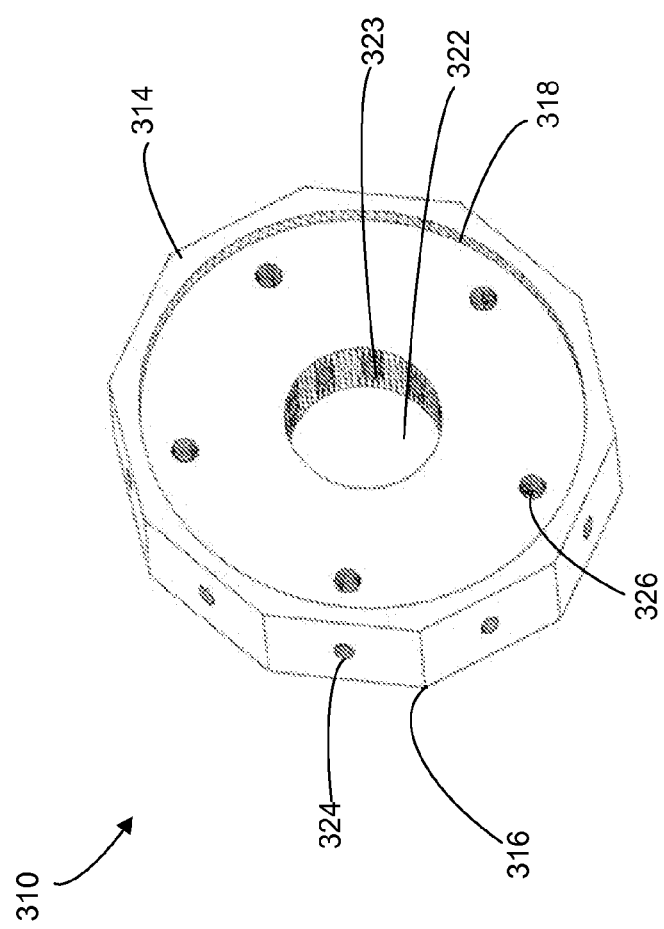
FIG. 19 is a perspective view of a portion of a hub assembly in accordance with a further preferred embodiment of the present invention.
Figure 20:
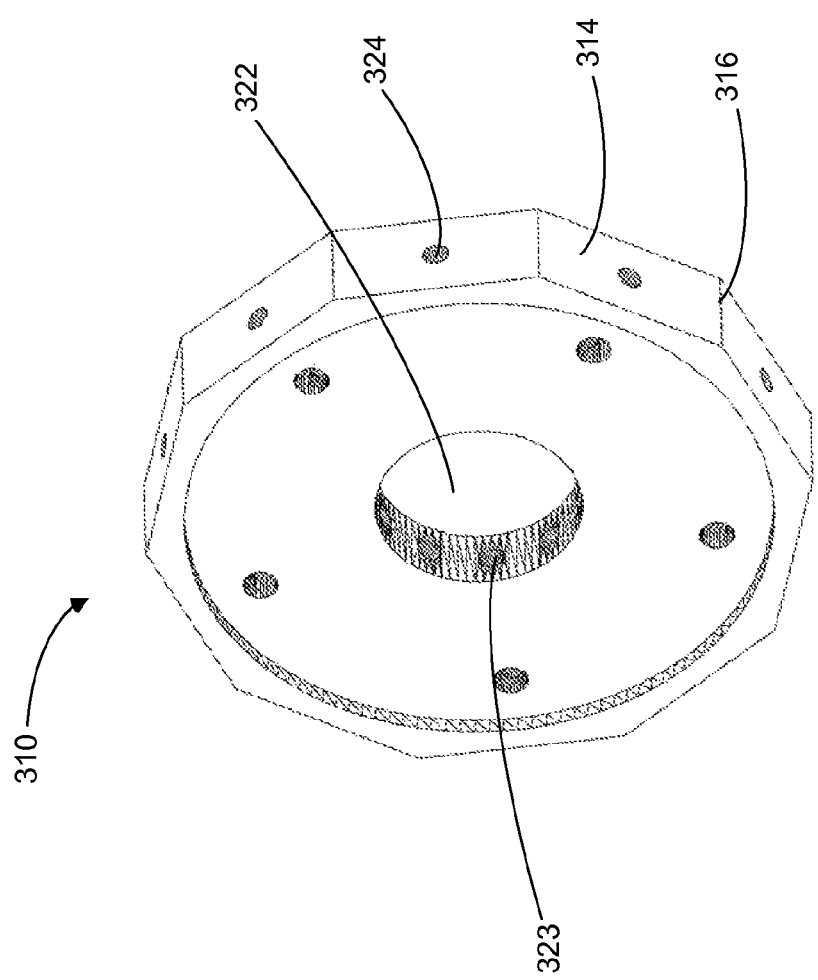
FIG. 20 is another perspective view of the portion of the hub assembly of FIG. 18.

FIGS. 19-27 depict the decortication element assembly. FIGS. 19 and 20 depict inner spacer 310 of the hub assembly. The space can be built to accommodate any operational width. Space 322 is hollow and accepts air from the central shaft. Holes 323 and 324 represent air channels from the interior space 322 to the exterior of the spacer. Air combs 510 are secured to external face 314 of the spacer and external face 414 of the outer wheel hubs. Each air comb 510 is attached by a blade clamp 610 by screws or a similar fastening device. A gasket may be inserted on face 314 to create an air tight seal between the spacer and the air comb.

Figure 21:
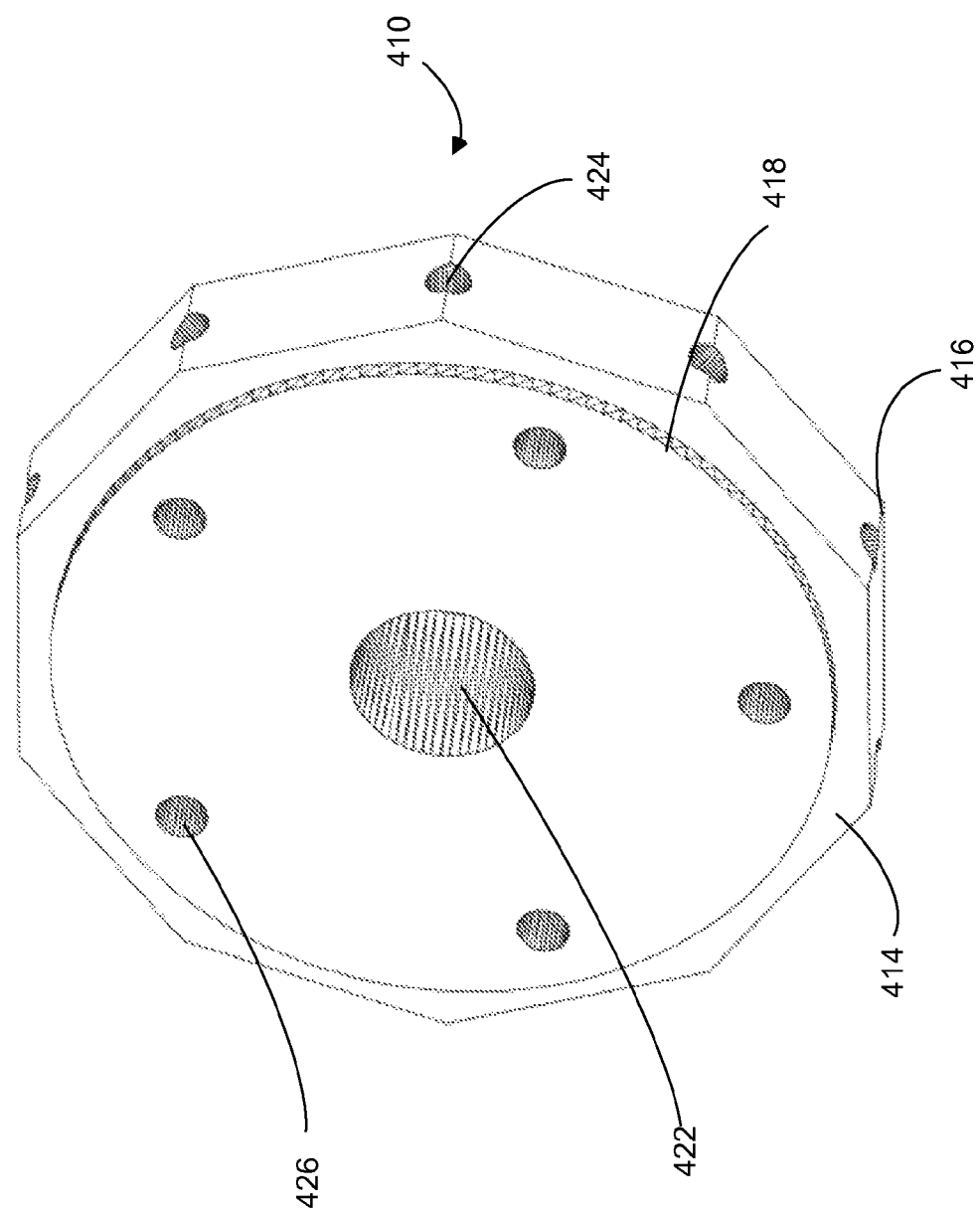
FIG. 21 is a perspective view of a portion of a hub assembly.
Figure 22:
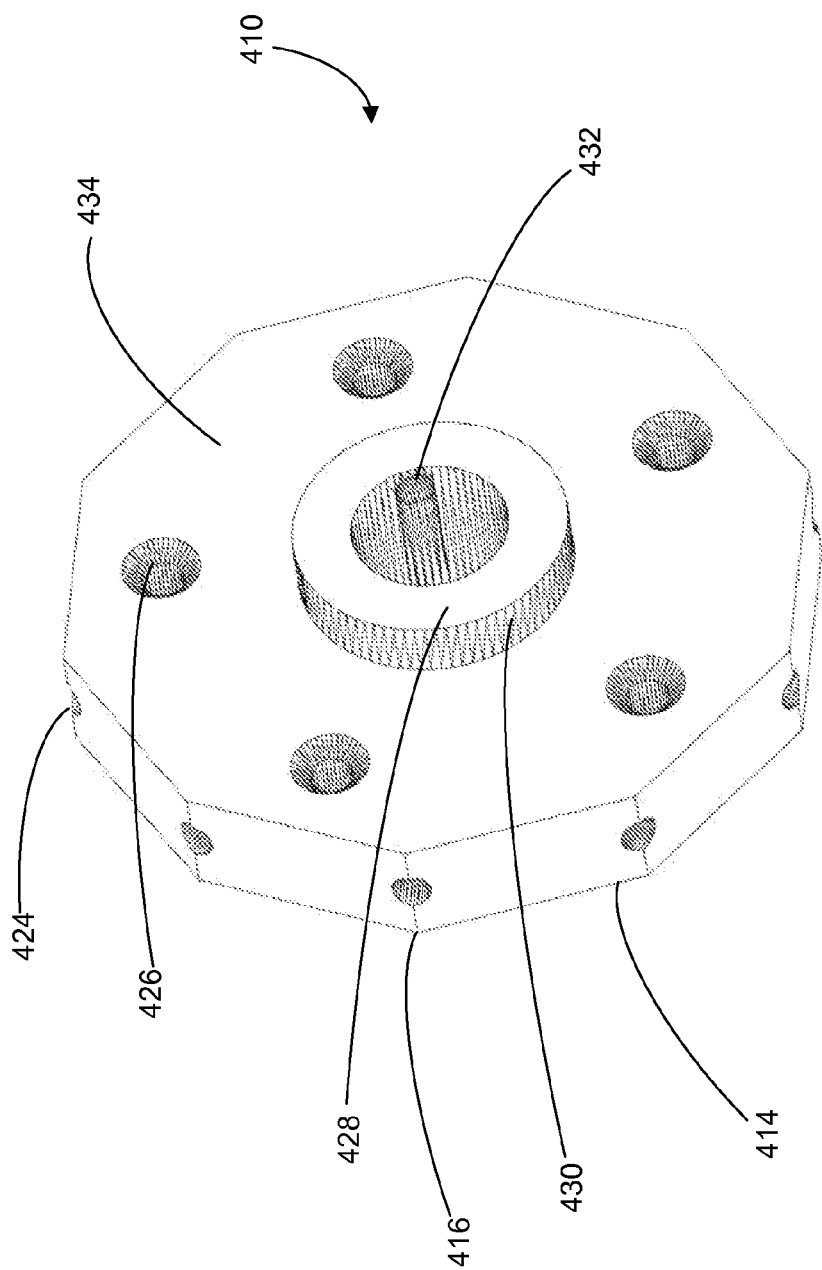
FIG. 22 is another perspective view of the portion of the hub assembly of FIG. 20.

FIGS. 21 and 22 depict the outer wheel hubs 410. Outer wheel hubs 410 are bolted on both sides of inner spacer 310 with screws through screw insertion points 326 and 426. A rubber gasket seal may be inserted between rims 318 and 418 to form an airtight seal.

Space 422 accepts the central drive shaft which is anchored by a screw inserted through hole 432. The outer face 434 of outer wheel hub 410 also has a protruding rim lip 430 and rim face 428. Hole 432 extends through to rim lip 430. A gasket or washer may be inserted around the central drive shaft and into space 422 to create an air tight seal.

Figure 23:
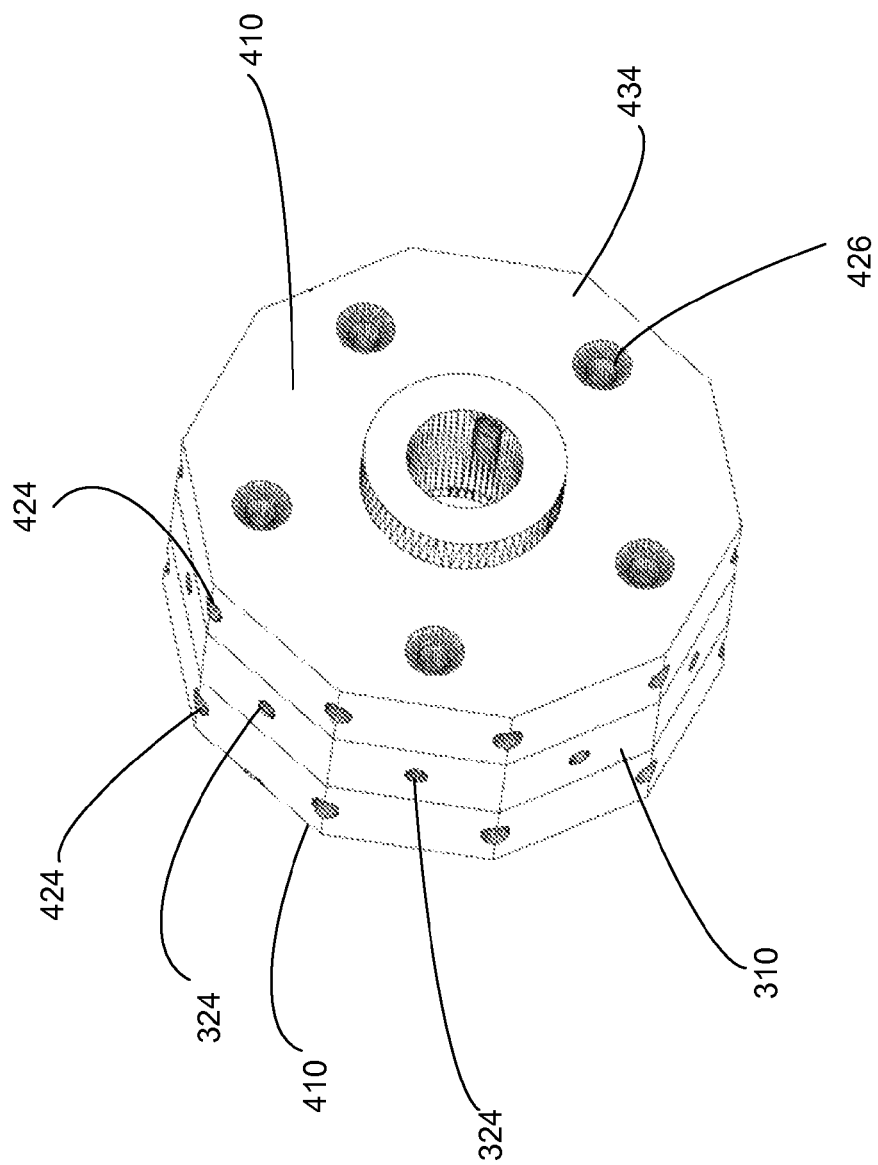
FIG. 23 is a perspective view of an assembled hub.
Figure 27:
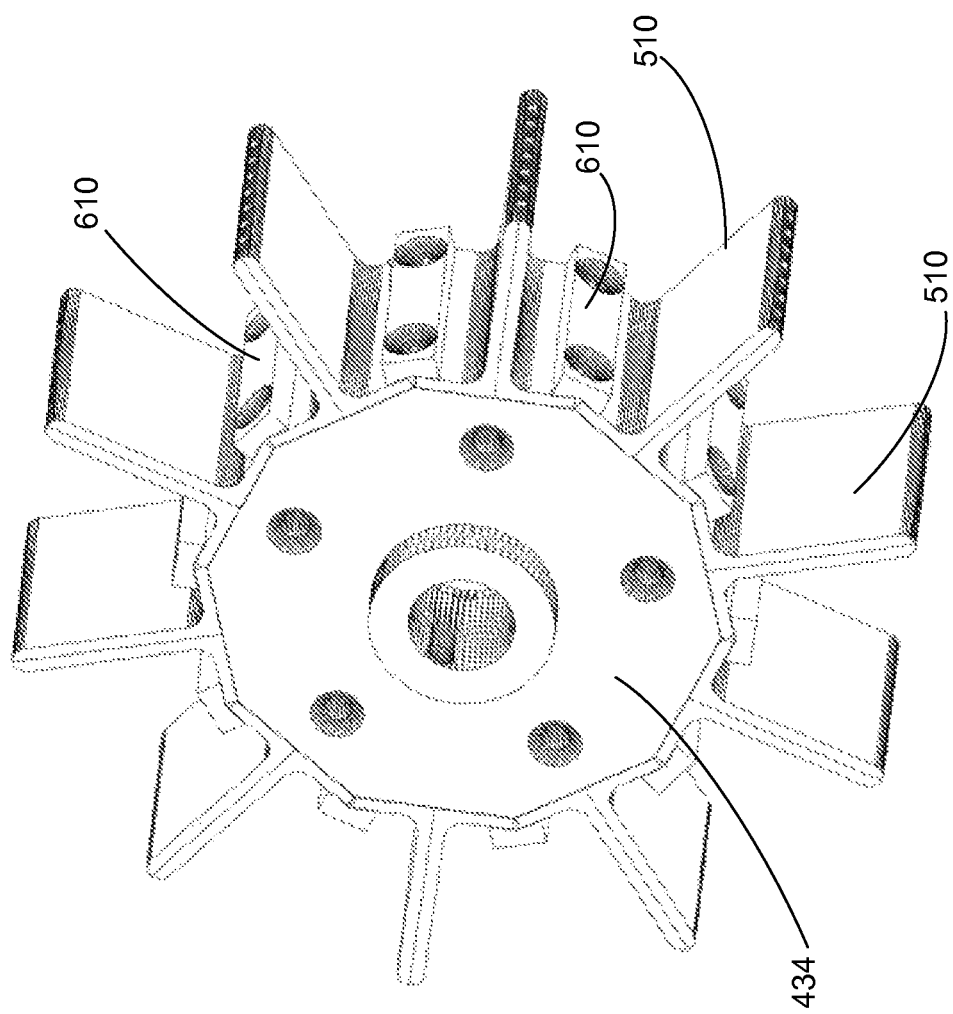
FIG. 27 is a perspective view of a hub and blade assembly.

FIGS. 23 and 27 depict the entire wheel hub assembly without air combs 510 and with air combs 510. FIG. 27 represents a complete decortication element.

Figure 24:
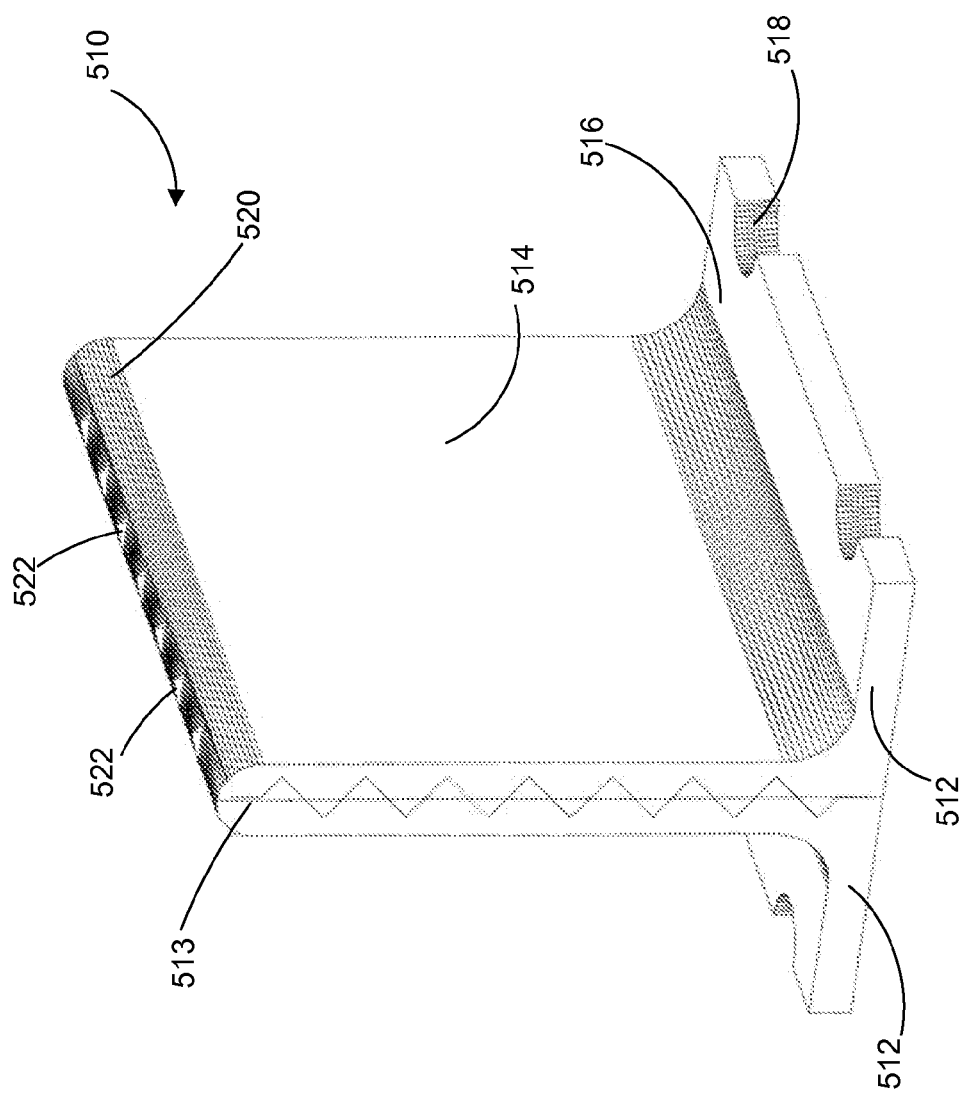
FIG. 24 is a perspective view of a decorticator blade.
Figure 25:
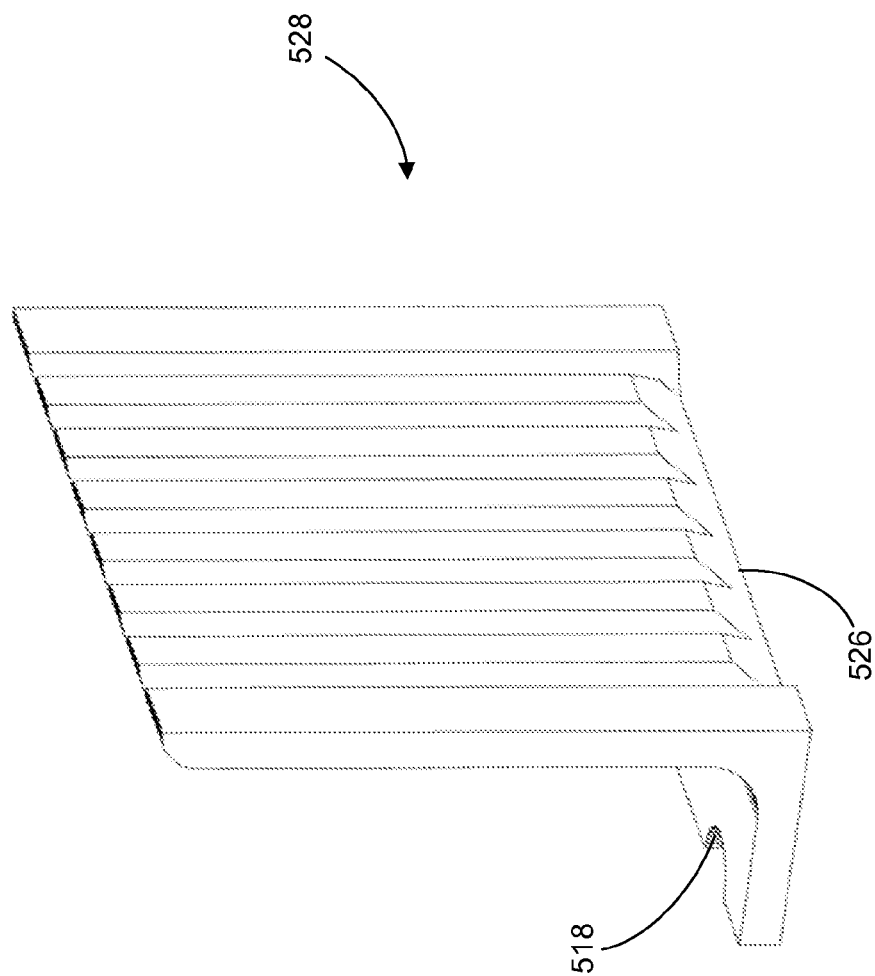
FIG. 25 is a perspective view of an assembly component for the decorticator blade of FIG. 23.

FIG. 24 shows the air comb 510 which is assembled by placing two L-shaped blades 528 depicted in FIG. 25 back to back. The assembled air comb is attached to the hub assembly FIG. 23 with screws through points 518. Blade face 514 extends out from the hub assembly and comes to a rounded tip 520. Each L-shaped blade 528 has grooves cut into the back side of blade face 514. When the two L-shaped blades are positioned back to back these grooves form air channels running from interior bottom 526 to the ports 522 located in the rounded blade tip 520. Sides 512 seal these channels. Lateral side gap 513 may be sealed by welding or by resin.

Figure 26:
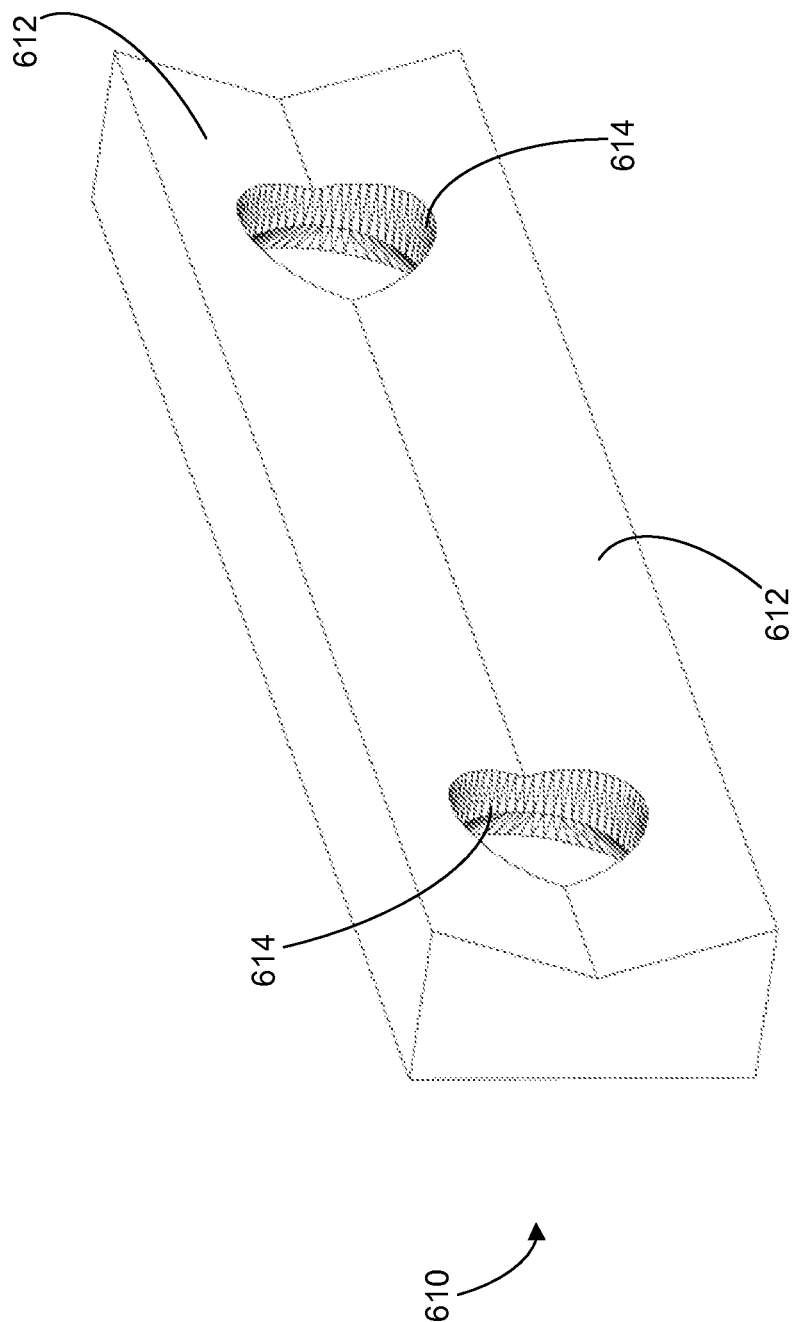
FIG. 26 is a perspective view of a clamp for assembling the blade of FIG. 23 to the hub of FIG. 22.

FIG. 26 depicts the blade clamps which secure air combs 510 to the wheel hub assembly. Angles 612 correspond to angles 316 FIGS. 19 and 20 and angles 416 FIGS. 21-22. Blade clamp 610 fits over the edges of air comb 510. Screws inserted through holes 614 correspond to holes 518 in air comb 510 and holes 424 in outer wheel hub 410. In addition, the method of decortication described in this disclosure provides a suitable means for constructing a highly efficient and effective decortication machine capable of achieving the rapid throughput capacities required to economically operate said decortication machine in cooperation with modern forage or combine harvesting equipment, as well as equal or exceed the throughput of modern stationary decortication systems.

There are undoubtedly numerous modifications and arrangement of parts that may be construed from this invention. The previous description provides guidelines for building and operating this invention and is not meant to limit the operation of this invention, in so far as potential modifications and arrangements relate to the following claims.

Consistent with the description herein and the appended drawings, some features of exemplary embodiments include:
1) A variable throughput decortication machine possessing a unique decortication element, which effectively and efficiently isolates the outer bast fiber of plant stalks from the inner woody core thereof, comprising the following arrangement of working parts:
   a. Feeding elements consisting of a lower and upper feed belt assembly that compresses plant stalks into a uniform mat and conveys said uniform mat over a feed table and under the influence of a gripping feed roll. It is the intention, ability, design, and purpose to achieve such result that is claimed novel.
   b. A feed table with an adjustable angle of inclination and length composed of metal or suitable composite material and coated with a slick hydrophobic coating or finish for reducing friction and improving flow ability as the uniform mat is driven over the feed table and under the influence of the gripping feed roll.
   c. An upper feed belt composed of a gripping polyurethane, such as "sure grip," to securely hold the fibrous mat while simultaneously feeding it through the decortication element so that the entire length of the plant stalks contained in the mat are decorticated.
   d. A lateral baffle or guide assembly between the crushing rolls and through the gripping feed roll that contains the uniform mat and prevents it from lateral escape.
   e. A feed table edge that is inversely contoured to match the concave tip of the breaker air comb blade tips.
   f. The distance of clearance between the orbital circumference of the upper breaking roll and the edge of the feed table is adjustable within a range of 5 millimeters and 44 millimeters. This range of distance provides for optimal fiber cleaning, minimizes damage, and allows for operation on fibrous plant stalks of varying degrees of moisture content. g. Breaking and scutching rolls composed of 2 outer hubs and a hollow center spacer. The assembly is either circular or polygonal is shape and attaches to hollow central drive shaft capable of delivering air to the central spacer which is hollow. Air comb blades attach to the outer circumference of the hubs. The center spacer is hollow and has channels cut to the outer circumference that deliver air to the air combs.
   i. Air comb blades are made of metal or other suitable hardened material capable of withstanding rapid repeated impacts with fibrous materials of wet or dry physical state and capable of delivering forced air in any form: jet, stream, band, etc. in relative proximity to the point of contact with fibrous materials and from the extremity or tip of the air comb blade. It is understood that there are numerous means for achieving this result. It is the intention, ability, design, and purpose to achieve such result that is claimed novel.
   j. The orbital paths of the breaking and scutching rolls intermesh within the circumferential paths of the air comb blades. The degree or severity of intermeshing may be controlled by adjusting the height of the air comb blades on either the scutching or breaking rolls.
   k. A novel decortication element design consisting of an upper breaking roll that has a greater outer diameter than the lower scutching roll. Said assembly creates a uniquely beneficial sweeping action during the intermeshing of the orbital paths of the breaking and scutching rolls. Specifically, the lower scutching roll travels at a faster peripheral speed than the upper breaking roll. As a result, when the lower scutcher blade enters the orbital path of the upper breaking roll, a point in space referred to as the pitch point, it will gain distance from the trailing breaking roll blade and gain distance on the leading breaking roll blade throughout the period of intermeshing orbits. This action creates an additional bending and flexing of the fibrous material which advantageously loosens and frees core from the fiber. It will be noted that by altering the pitch point of the lower scutching roll blades' orbit in relation to the breaking roll blades' orbit that a variety of sweeping effects may be provided. Other novel aspects are not limited to this design innovation and may be incorporated in a breaking and scutching roll assembly that is composed of two rolls of equal outer diameter and number of blades.
   l. Air comb blades and feed table edge are rounded and smoothed in such a manner that there are no sharp edges that could sever or cut the fibrous material during decortication. These edges may either be smooth or cut with longitudinally aligned micro-combing grooves running parallel to the path of travel of the fibrous materials. The rounded and smooth edges minimize fiber damage by reducing friction and allowing fibrous materials to slip across the surface. The rounded edges with micro-combing grooves have similar benefits but also enhance the ability to open the fiber bundles during decortication which is beneficial.

2) A novel air comb design for breaking and scutching roll blades that functions to reduce fiber damage, improve fiber cleaning and opening, enhance material handling, and simplify construction and repair, consisting of:
   a. Two L-shaped pieces of suitable metal with concaved tips and bases that attach to breaking and scutching hub and spacer assembly, otherwise referred to as rims, provide a unique blade assembly for the decortication element. The two L-shaped pieces are symmetrical and fit together back to back. They may be sealed airtight by welding together, resin, or any other suitable means.
   b. The outer surface of the air comb blade may be finished or coated with a slick hydrophobic coating or finish for reducing friction and improving flow ability.
   c. Air comb blades attach to the exterior rims and extend longitudinally across the surface.
   d. Air comb blades may be angled directly perpendicular to the directional flow of the fibrous material or at an offset angle forward or backward.
   e. Pluralities of channels are cut into the back side of the individual L-shaped blades that reduce in volume from the base to the tip of the individual blade. These channels form jet nozzles when the individual blades are joined together back to back.
   f. The base of the air comb blades have male key grooves and male ports that correspond to female key grooves and female ports that are cut into the exterior of the breaking and scutching rolls. Male-female key grooves and ports allow for simple fastening and detachment, as well as easy angular adjustment, forward and backward, with respect to direction of orbital travel by means of screws or similar control and fastening mechanism.

3) A novel breaking and scutching roll assembly consisting of 2 outer hubs and 1 inner spacer.
   a. The inner spacer may be constructed to accommodate any lateral width.
   b. The outer hubs may be journal and keyed in to lock the air comb blades in place. c. The inner spacer is hollow to accept air from the central shaft and may include an internal baffle to direct air flow to a limited section of the inner circumferentially arc.
   d. The assembly may be sealed air tight by a variety of means including but not limited to gaskets, washers, and resins. 4) A decortication machine according to claims 1, 2, and 3 wherein the feed element and decortication elements are controlled by separate variable speed drives that allow the number of impacts per forward travel to be precision calibrated.

4) A plant stalks decortication method that isolates the outer bast fiber from the woody core thereof, consisting of the following beneficial actions.
   a. An initial compression and crushing action between an lower and upper belt and pressure rolls serves to break down the bonds between the bast fiber skin and woody interior of the fibrous plant stalks, creating a uniform mat of flattened fibrous plant stalks for decortication, removes moisture and gums, and drives the mat forward over the feed table edge and into the orbit of the decortication elements.
   b. A second gripping feed roll that is part of the upper feed belt assembly grips the fibrous mat as it is fed forward and acted up by the decortication elements. The upper belt should be composed of a polymer such as polyurethane that is capable of gripping the material and not allowing it to slip forward.
   c. A third breaking action bends and flexes the fibrous material down over the feed table between 60 to 120 degree angle shattering the woody core and loosening the bast fiber from the core.
   d. A forth scutching action catches the advancing fibrous material in substantially the same place as the previous breaking impact bending the advancing fibrous material back the opposite direction at a 60 to 120 degree angle and forcing it to momentarily be subjected to additional bending and flexing as it is caught between the intermeshing orbits of the breaking and scutching roll blades orbital paths. The additional bending and flexing causes the shattered and loosened core to be beaten or whipped from the fiber.
   e. A fifth combing, opening, and cleaning action from combing grooves, micro or otherwise, that are cut into the feed table and tips of the air comb blades on both the breaking and scutching rolls and run parallel to the directional flow of the fibrous material that serve to open the fiber bundles and improve fiber cleaning.
   f. A sixth pneumatic cleaning action comprised of a forceful air blast delivered from the peripheral extremity of the breaking and scutching roll blades, such device otherwise referred to as air comb blades, and delivering said air blast at the point of contact with the fibrous materials thereby effectively removing core from the fibrous materials, opening the fiber bundles, reducing moisture, preventing fiber from wrapping around moving parts, and aiding in post-decortication fiber recovery. g. A seventh pneumatic action consisting of blasting chilled air through the pneumatic cleaning element, i.e., air comb, for the purpose of causing the woody core to more rapidly and easily separate from the fibrous materials.
   h. An eighth pneumatic action inversely consisting of blasting heated air through the pneumatic cleaning element, i.e., air comb, for the purpose of rapidly reducing the moisture content of the fibrous materials.
   i. A ninth decortication action derived from engineering the lower scutching roll to travel at greater peripheral speed than the upper breaking roll to increase the cleaning efficiency of said lower scutching roll.
   j. A tenth friction reducing action provided by the slick hydrophobic coating, finishing, or material applied to the feed table, feed table edge, and all air comb blade tips that allows the fibrous materials to slip and flow through and over the previously listed elements.
   k. An eleventh lateral guiding action throughout the process beginning in the feed element with lateral baffles and continuing through the breaking and scutching rolls with concave blade tips. Lateral control is also enhanced by a decortication element width that exceeds the feed element width by 0.5 or more inches on either side.

5) A plant stalk decortication method according to claim 5 that utilizes an air blasting feature located in the peripheral tips of the breaking and scutching blades, and otherwise referred to as an air comb, to minimize the duration and degree of contact between said blades and the fibrous materials, resulting in less severe bending and depth of intermeshing between the blades of the breaking and scutching roll air comb blades, which helps to minimize mechanical fiber damage while enhancing material handling post-decortication.

6) A plant stalks decortication method according to claim 6 that permits variable throughput capacities based on the operational width of the breaking and scutching rolls and that may be mounted on a harvest head implement, pick-up head implement, or utilized as part of a stationary mill.

What is claimed is:

1. A fibrous plant stalk decorticator comprising:
a feeding mechanism;
a breaker having a first plurality of blades;
a scutcher having a second plurality of blades, the scutcher positioned such that the first and second pluralities of blades overlap;
a plurality of air channels within the bodies of one or more of the blades and configured to provided pressurized air to a fibrous plant stalk as it is passed through the decorticator.

2. A decortication element for use in a fibrous plant stalk decorticator, the decortication element comprising:
a first outer hub;
a second outer hub;
and a center spacer coupled to the first and second outer hubs;
wherein one of the outer hubs or the center spacer is provided with air channels within its structure and in fluid communication with a source of compressed air.

3. The decortication element of claim 2, further comprising a plurality of blades, wherein one or more of the blades includes air channels within its structure for delivering the compressed air to a fibrous plant stalk.

4. The decortication element of claim 3, wherein the blades comprise two identical half assemblies.

5. A fibrous plant decorticator comprising the decortication element of claim 3.

6. The fibrous plant decorticator of claim 5, comprising at least a first decortication element and a second decortication element.

7. The fibrous plant decorticator of claim 6, wherein the first decortication element includes twice the number of blades as the second decortication element.

8. The fibrous plant decorticator of claim 7, wherein the blades comprise a concave edge.

9. The fibrous plant decorticator of claim 8, further comprising a feed table, wherein the angle of the feed table relative to the first and second decortication elements is movable from a first angle to a second angle.

10. The fibrous plant decorticator of claim 8, wherein the feed table edge has a shape corresponding to the concave shape of the blade edge.

* * * * *